United States Patent [19]

Kaneko et al.

[11] Patent Number: 5,113,296
[45] Date of Patent: May 12, 1992

[54] MECHANISM FOR WINDING A TAPE FROM A TAPE CASSETTE ONTO A ROTATABLE CYLINDER OF A VCR

[75] Inventors: Hisao Kaneko; Kichizaemon Okazaki, both of Yokohama; Toshimichi Terada, Chigasaki, all of Japan

[73] Assignee: Hitachi, Ltd., Tokyo, Japan

[21] Appl. No.: 430,416

[22] Filed: Nov. 2, 1989

[30] Foreign Application Priority Data

Nov. 7, 1988 [JP] Japan ................. 63-279342
Jun. 14, 1989 [JP] Japan ................. 1-149582

[51] Int. Cl.$^5$ ..................... G11B 5/027; G11B 5/008
[52] U.S. Cl. .............................. 360/85; 360/95
[58] Field of Search ....... 360/85, 84, 95, 130.2–130.24

[56] References Cited

U.S. PATENT DOCUMENTS

| | | | |
|---|---|---|---|
| 4,593,330 | 6/1986 | Warren | 360/85 |
| 4,642,713 | 2/1987 | Ohira et al. | 360/85 |
| 4,658,310 | 4/1987 | Kimura | 360/95 |
| 4,709,280 | 11/1987 | Delacou | 360/85 |
| 4,807,064 | 2/1989 | Miyamoto et al. | 360/95 |
| 4,807,077 | 2/1989 | Zaitsu et al. | 360/132 |
| 4,908,723 | 3/1990 | Ohyama et al. | 360/85 |
| 4,930,028 | 5/1990 | Kunimaru et al. | 360/95 |
| 4,991,039 | 2/1991 | Kaku | 360/85 |

FOREIGN PATENT DOCUMENTS 0194153 12/1984 Japan .

OTHER PUBLICATIONS

Video Salon, vol. 4, 1989.

Proceeding of the 5th Design Automation Engineering Lecture.

*Primary Examiner*—Aristotelis Psitos
*Assistant Examiner*—Jefferson Evans
*Attorney, Agent, or Firm*—Antonelli, Terry, Stout & Kraus

[57] ABSTRACT

Movable members of a tape guide member for tape loading are disposed in plural numbers on both the upstream side and the downstream side of a tape running path with respect to a rotatable cylinder, or are disposed in plural number on at least either the upstream side or the downstream side. The plurality of movable members are disposed offset from each other in the radial direction of the rotatable cylinder. Tilt guides for converting the tape running direction are disposed between the associated movable members, and fixed to the stationary component side. A guide passage forming member along which the movable members are guided is also fixed to the stationary component side. Guide portions of the guide passage forming member are provided in plural number individually associated with the movable members. The guide portion nearer to the rotatable cylinder is set to always have a larger tilt angle than that of the outer guide portion with the plane of a tape cassette being a reference. The tilt angles of the guide portions are made different from each other between the upstream side and the downstream side, and are set to direct upwardly with respect to the loading direction at least on either one of the upstream side and the downstream side. A tape tension control member is disposed along the associated guide portion for being rotated about a stationary fulcrum upon movement of the movable member of the tape guide member.

6 Claims, 12 Drawing Sheets

MECHANISM FOR WINDING A TAPE FROM A TAPE CASSETTE ONTO A ROTATABLE CYLINDER OF A VCR

BACKGROUND OF THE INVENTION

The present invention relates to a tape loading mechanism for VCRs (Video Cassette Recorders) adapted to withdraw a magnetic tape out of a tape cassette for winding it round a cylinder or to put the magnetic tape wound round the cylinder back into the tape cassette, and more particularly to a tape loading mechanism for VCRs which requires high reliability of operation.

For improved operability, VCRs are provided with tape loading mechanisms which automatically withdraw a magnetic tape out of a tape cassette for winding it round a cylinder (called "loading"), or to automatically put the magnetic tape wound round the cylinder back into the tape cassette (called "unloading"). The tape loading mechanism comprises, for example, a loading motor, a loading ring and a tape guide member. The tape guide member is composed of a tape guide unit coming into contact with the magnetic tape and a guide base for supporting the tape guide unit. When the loading ring is rotatably driven by the loading motor, the guide base of the tape guide unit coupled to the loading ring is moved such that the magnetic tape is withdrawn out of a tape cassette by the tape guide unit mounted on the guide base. When the guide base reaches a predetermined position close to the cylinder, it is fixedly held at that position. Specifically, two such guide bases are moved round the cylinder in opposite directions. When those two guide bases are positioned at their predetermined positions, the magnetic tape is in a loaded condition where it is helically wound round the outer peripheral surface of the cylinder over a range of predetermined angle. In the unloading operation, the two guide bases are moved in directions opposite to those in the loading operation, so that the magnetic tape is taken up by a reel in the tape cassette.

The tape guide unit, which is mounted on the guide base and comes into contact with the magnetic tape, comprises a guide roller and a tilt guide. Hereinafter, the guide base located on the upstream side of the cylinder (i.e., on the side where the magnetic tape running in the forward direction begins to contact with the cylinder) will be referred to as an upstream guide base, while the guide base located on the downstream side of the cylinder will be referred to as a downstream guide base.

The cylinder is mounted onto the chassis surface on a tilt A tape lead portion for guiding the magnetic tape wound helically round the outer peripheral surface of the cylinder is tilted with respect to the chassis surface such that the inlet side becomes higher than the outlet side.

Under the condition where the upstream guide base has been positioned by a catcher in the predetermined position close to the cylinder, a running path of the magnetic tape from the tape cassette to the guide roller on the upstream guide base is made parallel to the chassis surface. To keep such parallel relation, the level of the magnetic tape is restricted by the guide roller. The tilt guide on the upstream guide base is inclined in a predetermined direction with respect to the chassis surface. The tilt guide is so inclined as to gradually descend the running path of the magnetic tape. This allows the magnetic tape to be contacted with the outer peripheral surface of the cylinder without any torsion, after it has come into contact with the tilt guide. Also, the magnetic tape is guided by the tape lead portion of the cylinder to run along the outer peripheral surface of the cylinder while being held at its lower edge against the tape lead portion without causing under forces.

Under the condition where the downstream guide base has been positioned by a catcher in the predetermined position close to the cylinder, the magnetic tape which has been so guided round the outer peripheral surface of the cylinder as to descend gradually by the tape lead portion, is converted in the running direction by the tilt guide on the downstream guide base such that it now ascends without any torsion. The guide roller on the downstream guide base makes the running path of the magnetic tape at the same level as that on the inlet side and the tape face vertical to the chassis surface. The magnetic tape is thereby taken up smoothly by the take-up reel in the tape cassette.

The upstream guide base and the downstream guide base are moved along predetermined guide paths as the loading rings revolve. In order to prevent damage of the magnetic tape, it is required that an attitude of the magnetic tape is kept stable during such movement as well.

If the force exerted on the magnetic tape during the course from start of the loading operation to end thereof is given by only a force acting in the lengthwise direction of the magnetic tape that is attributable to the force applied for withdrawing the magnetic tape from the tape cassette, the magnetic tape could be withdrawn from the tape cassette while keeping the same attitude as originally accommodated in the tape cassette. Under that condition, there occurs no problem such as damage of the magnetic tape.

However, because the tape lead portion of the cylinder is formed to be higher on the inlet side and lower on the outlet side, the attitude of the magnetic tape is forced to change during process of the loading operation. The magnetic tape first comes into contact with the outer peripheral surface of the cylinder when it is withdrawn out of the tape cassette for loading. Further, the magnetic tape successively comes into contact with the other tape guide members, causing the magnetic tape to be modified in its running path and restricted in its level. The attitude of the magnetic tape is thereby changed.

If the attitude of the magnetic tape is changed during the loading operation in that way, the contact state of the magnetic tape against the tape guide member and the cylinder is also changed. This may damage the edge of the magnetic tape. In the case where a change in the attitude of the magnetic tape produces a force on the magnetic tape acting in the widthwise direction thereof, for example, the edge of the magnetic tape is strongly pressed against a flange portion of the guide roller. Since the magnetic tape has already been withdrawn from the tape cassette at the time of occurrence of such event, the edge of the magnetic tape is abraded and damaged by the flange portion of the guide roller.

Further, if the attitude of the magnetic tape is changed during the loading operation as mentioned above, the loading operation might be completed with such change left uncorrected. In this case, the magnetic tape is so offset to be ridden over the flange portion of the guide roller or the tape lead portion of the cylinder even after the loading operation. If the magnetic tape is run under that condition, the edge of the magnetic tape would be damaged. In the case where the magnetic tape is lifted up away from the tape lead portion, a magnetic head may latch the edge of the magnetic tape during the recording or reproducing operation.

As will be apparent from the above explanation, the change in the attitude of the magnetic tape is a very important factor in respect of a level shift of the magnetic tape. It is therefore required to stabilize the attitude of the magnetic tape by reducing an amount of the level shift of the magnetic tape as well as smoothing the change of the tape level. As an attempt to achieve it, there is reported a paper written by Toshihiko Nakajima, et al., "Application of CAD to Development of VTR Mechanism System", Proceeding of the 5th Design Automation Engineering Lecture cosponsored by Japan Society of Mechanical Engineers and Japan Society of Precision Engineering (1987-7-9), pp. 28-30. This paper discusses the method of applying CAD (Computer Aided Design) to design of tape loading mechanisms for analyzing the attitude of a magnetic tape from the standpoint of a shift amount of the tape level, with a view to reduce the shift amount and smooth the change in the tape level for stabilizing the attitude of the magnetic tape.

In the VCRs which require very high reliability, such as VCRs for business use by way of example, it is important for the purpose of surely preventing damage of the magnetic tape that the tape loading mechanism is designed to make the shift amount of the tape level smaller than that in VHS-type VCRs for home use.

As explained above, in conventional VCRs, the upstream guide base is positioned close to the cylinder and the running path of the magnetic tape is modified by the tilt guide to direct downwardly such that the magnetic tape advances along the tape lead portion of the cylinder, during the loading operation. The downstream guide base is also positioned close to the cylinder to modify the running direction of the magnetic tape which is departed away from the cylinder to direct downwardly such that the magnetic tape ascends.

However, when the running direction of the magnetic tape is modified by the tilt guide in that way, there occurs a force for urging the magnetic tape to move in the axial direction of the tilt guide (i.e., in the widthwise direction of the magnetic tape). The widthwise movement of the magnetic tape due to such a force is restricted by the guide roller and the tape lead portion of the cylinder both of which serve to restrict the tape level. The above force produced by the tilt guide to move the magnetic tape in the widthwise direction thereof depends on such factors as an inclination of the tilt guide, a winding angle of the magnetic tape over the tilt guide, and a running speed of the magnetic tape. The larger the values of these factors become, the greater the force produced.

On the other hand, because of the difference in height between the inlet side and the outlet side of the tape lead portion of the cylinder, the tilt guide is required to make an abrupt conversion in the running direction of the magnetic tape. Therefore, the tilt guide is set to have a large inclination. In conventional VHS-type VCRs, since the running speed of the magnetic tape is relatively low during the loading operation, the aforesaid force tending to move the magnetic tape in the widthwise direction thereof has not become serious.

However, in those models of VCRs that the magnetic tape runs at a relatively high speed, such as high-vision VCRs and VCRs for business use, the force produced by the tilt guide for moving the magnetic tape in the widthwise direction thereof becomes very large during the reproducing step for search, in particular. The contact force of the magnetic tape against the flange portion of the guide roller and the tape lead portion of the cylinder is increased, resulting in a problem that the edge of the magnetic tape may be damaged.

Further, conventional tape running systems and tape loading mechanisms for VCR are known as disclosed in JP-U-59-194153 and an article in VIDEO SALON, "Fundamental Knowledge of Video", (1989, Vol. 4, p.40), for example.

In these magnetic recording and reproducing devices, a cylinder is mounted onto a chassis surface via a cylinder base on a tilt. A tape lead portion is provided on the outer peripheral surface of the cylinder for guiding the magnetic tape helically wound.

After the magnetic tape has been withdrawn out of a tape cassette, guide bases are positioned in their predetermined positions close to the cylinder by respective catchers provided integrally with the cylinder base. Under this condition, the running path of the magnetic tape from the tape cassette to the guide rollers on the guide bases is kept parallel to the chassis surface. Thus, in order to allow the magnetic tape to be contacted with the outer peripheral surface of the cylinder without any torsion, the tilt guides are mounted on the guide bases so as to tilt in the predetermined directions with respect to the chassis surface.

In addition, the guide bases are provided with tilt surfaces on which the tilt guides are to stand upright, respectively.

As described above, the prior art requires at least three different tilt surfaces; i.e., the tilt surface of the cylinder base on which the cylinder is to be mounted, the tilt surface of the guide base on the inlet side of the cylinder, and the tilt surface of the guide base on the outlet side of the cylinder.

In the prior art, therefore, manufacture of parts having those tilt surfaces has been accompanied by difficulties in point of ensuring the required part accuracy, and the complexity of part configurations has also pushed up the cost.

Particularly, in high-vision VCRs and VCRs for business use, since the magnetic tape is run at a relatively high speed, the various guides are required to meet higher accuracy in assembly.

SUMMARY OF THE INVENTION

It is an object of the present invention to provide a tape loading mechanism for the VCR which can surely prevent damage of a magnetic tape even when it runs at a high speed, make it easier to ensure accuracy of various tape guides, and reduce the cost easily.

To this end, in accordance with the present invention, there are provided parallel guide passages extending from a part of a tape cassette to the upstream and downstream sides of a cylinder, respectively and being substantially parallel to the chassis surface, and tilt guide passages extending from a part of the tape cassette to the upstream and downstream sides of the cylinder, respectively and being tilted in at least a part thereof with respect to the chassis surface. These parallel guide passages and the tilt guide passages serve as guide passages for separate guide rollers, respectively. Tilt guides are fixedly provided to be located between two guide rollers which have been guided to the upstream and downstream sides of the cylinder, respectively.

In the present invention, the guide rollers movable along the guide passages arranged on the outer side with respect to the cylinder are made to move preceding the guide rollers movable along the guide passages arranged disposed inner than the outer side guide passages.

Further, the present invention includes a pinch roller drive motor separately from a loading motor and from a capstan roller. The pinch roller drive motor swings a pinch roller arm integrally mounted on a worm wheel through a worm and the worm wheel.

The tilt guides and the tilt surfaces for running and loading the magnetic tape are all integrally incorporated into a cylinder base used for mounting the cylinder onto the chassis on a tilt, thereby achieving the above object.

In the present invention, also included is a mechanism for detecting tape tension of the magnetic tape on running. This mechanism is cooperated with the loading and unloading operation of the magnetic tape. Under an unloading operation, the tension detecting mechanism is stored back into the tape cassette.

Since each guide roller is moved along the guide passages independent from each other, the attitude and timing of the guide rollers during their movement can be set independently, and the shift amount of the tape level during the loading operation can hence be restrained to be very small. Also, since the tilt guides are located sufficiently away from the cylinder, tilt angles of the tilt guides and the tape winding angles over the tilt guides are made smaller, thereby allowing the magnetic tape to come into contact with the cylinder very smoothly and also to be departed away from the cylinder smoothly. Therefore, even when the magnetic tape is run at a high speed, the force in the widthwise direction of the magnetic tape produced by the tilt guides becomes small.

Further, by moving the guide rollers movable along the guide passages arranged on the outer side ahead of the guide rollers movable along the guide passages arranged on the inner side, the magnetic tape is withdrawn out of the tape cassette substantially parallel thereto, whereby the magnetic tape is smoothly withdrawn and the loading operation is stabilized.

Moreover, while the pinch roller arm is swung by the pinch roller drive motor, the pinch roller and the capstan remain in a contact state even after the pinch roller drive motor is deenergized, because of a self-lock between the worm and the worm wheel, once the pinch roller and the capstan are contacted with each other.

In addition, all of the tilt surfaces, which have presented difficulties in manufacture, are incorporated into the cylinder base serving as a reference for positional accuracy of the tape running system. Therefore, the positional relationship between the cylinder and the tilt guides is not based on assemblying accuracy of the chassis and other intermediate components, but on manufacturing accuracy of the cylinder base, thereby resulting in higher accuracy. Also, since in the present invention, additional tilt surfaces of the remaining components other than the cylinder base are incorporated into the cylinder base which has originally complicated shape including the intrinsic tilt surfaces, these components are simplified and then the cost is reduced.

Moreover, since the tape tension detecting mechanism is operated during tape running to issue a signal for detecting the tape tension, a reel motor can be controlled using the signal to improve accuracy of the tape running performance, whereby a reproduction signal obtained from a magnetic head provided on the rotatably cylinder is also improved in quality, while surely preventing damage of the magnetic tape running.

In addition, the tape tension detecting mechanism is stored back into the tape cassette under an unloading operation, and there occurs no trouble in loading of the tape cassette. That mechanism is brought into contact with the non-magnetic surface of the magnetic tape, so that the magnetic surface of the magnetic tape will not be damaged.

DETAILED DESCRIPTION OF THE PREFERRED EMBODIMENT

Hereinafter, an embodiment of the present invention will be described with reference to accompanying drawings.

Figure 1:
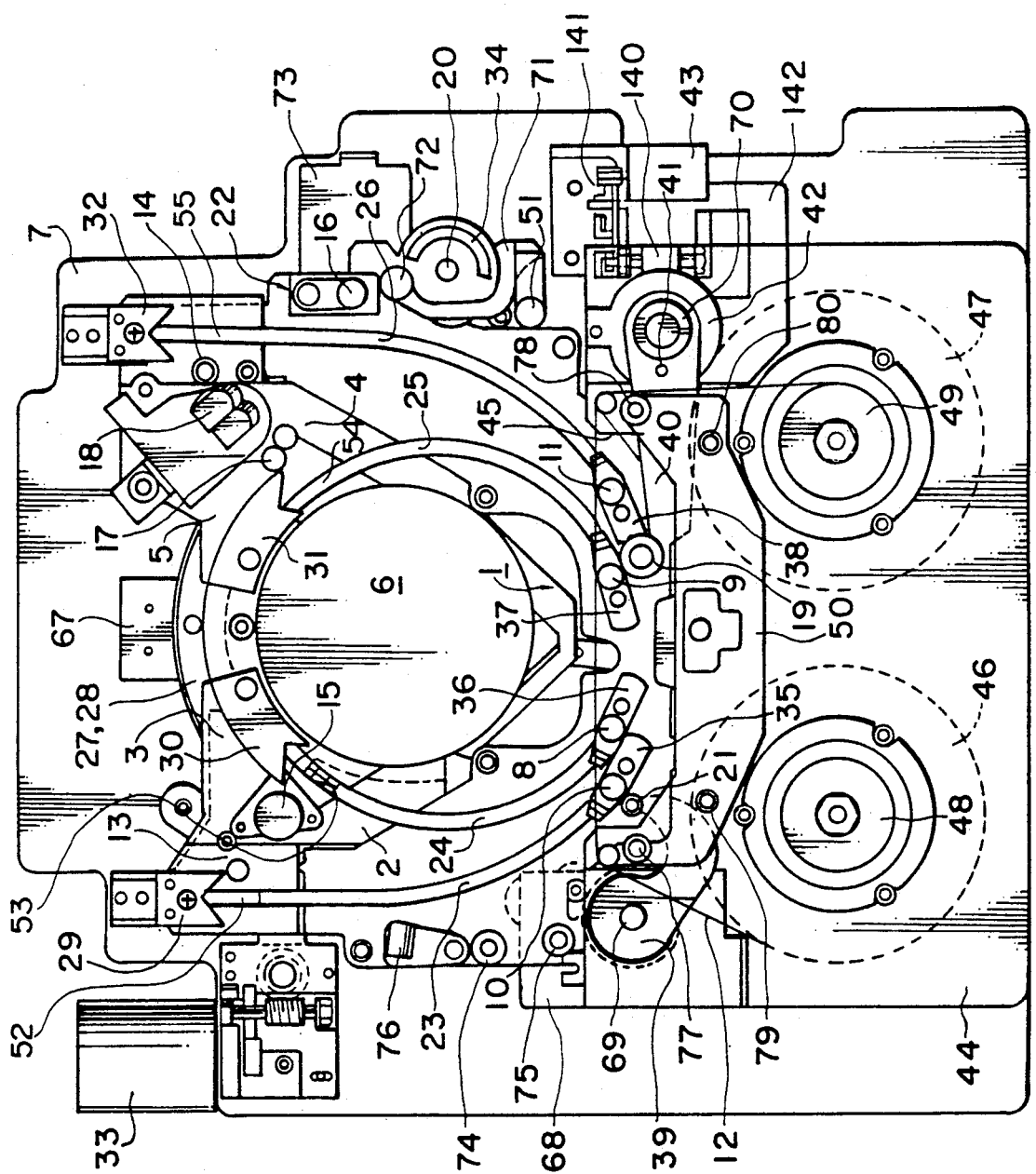
FIG. 1 is a plan view of a tape loading mechanism for a VCR according to one embodiment of the present invention in an unloaded condition where a magnetic tape is put back in a tape cassette.
Figure 2:
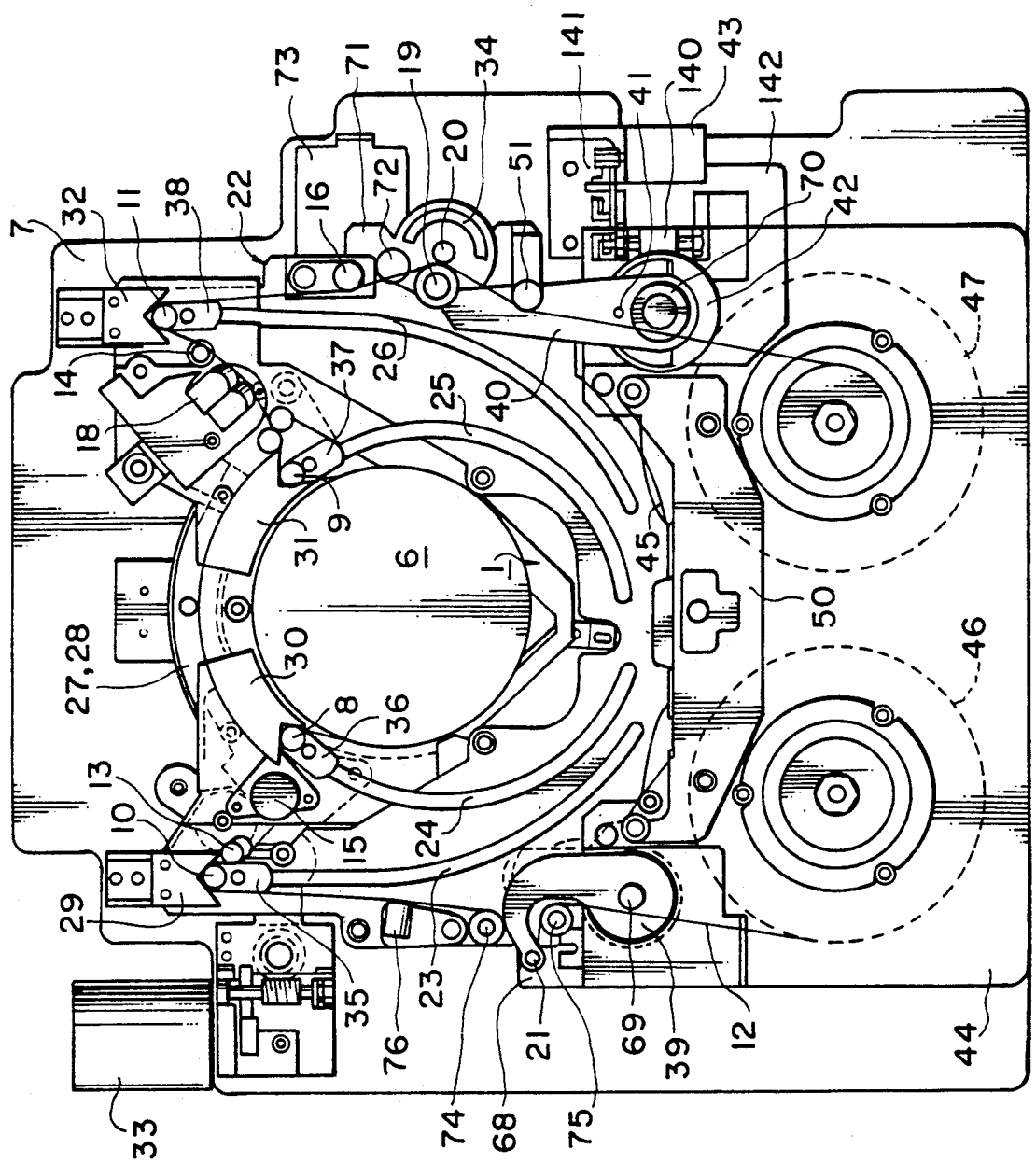
FIG. 2 is a plan view showing the mechanism in a completely loaded condition where the magnetic tape is wound round a cylinder.
Figure 3:
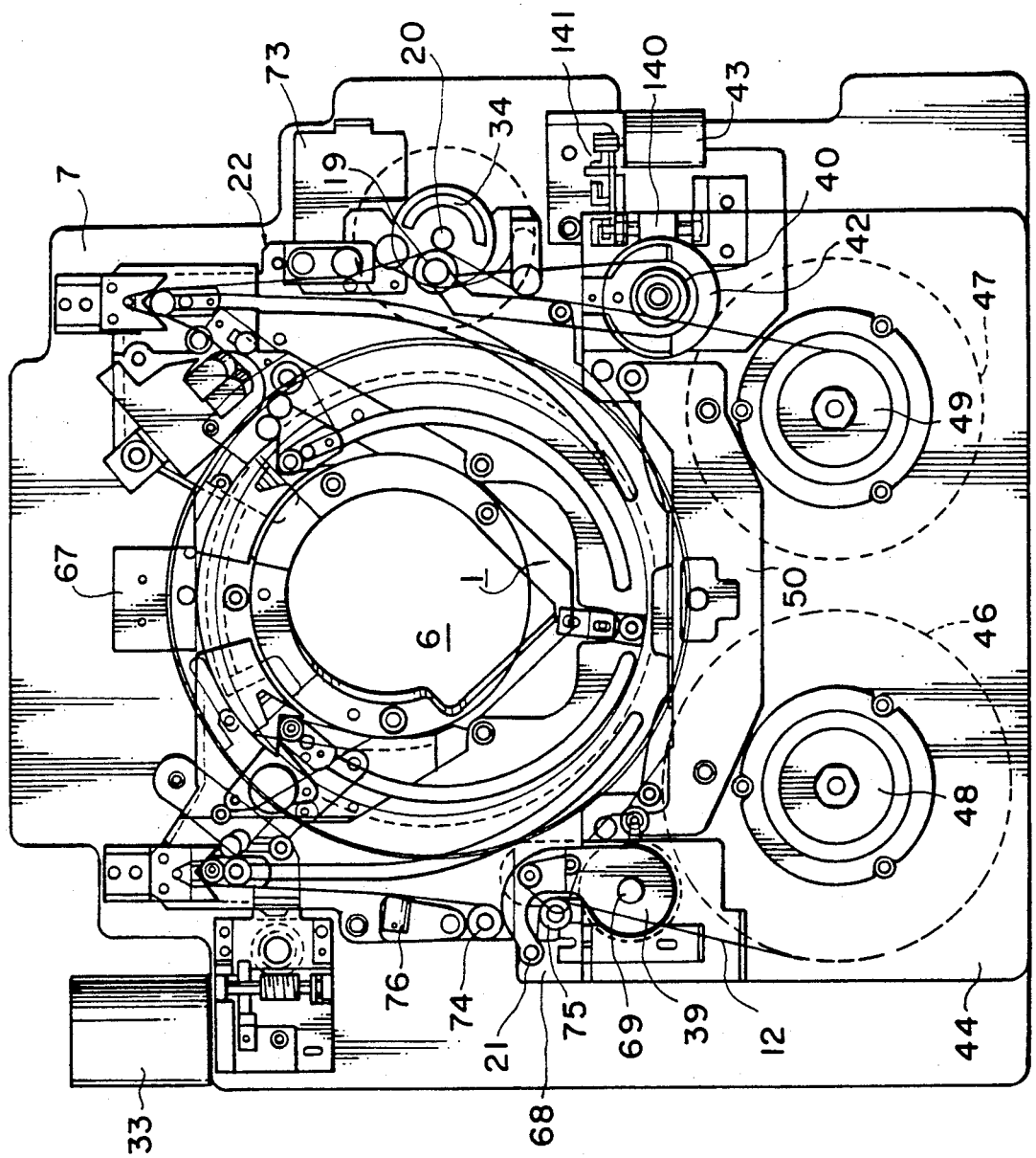
FIG. 3 is a perspective view showing the mechanism shown in FIG. 2.

Referring to FIGS. 1 to 3, a reference numeral 1 designates a cylinder base on which a cylinder 6 is mounted on a tilt by a predetermined angle with respect to a chassis 7. The element designated at a reference numeral 12 is a magnetic tape; 8 and 9 are guide rollers as upper limit guides; 10 and 11 are guide rollers; 13 and 14 are tilt guides; 15 and 16 are impedance rollers; 17 is a guide roller as a lower limit guide; 18 is an AC (audio and control) head; 19 is a pinch roller; 20 is a capstan; 21 is a tension roller; 22 is a guide plate; 23 to 26 are guide slits; 27 and 28 are loading rings; 29 to 32 are catchers; 33 is a loading motor; 34 is a capstan motor; 35 to 38 are guide bases; 39 is a tension lever 40 is a pinch roller arm; 41 is a drive pin; 42 is a worm wheel; 43 is a pinch roller drive motor; 44 is a tape cassette; 45 is an opening; 46 is a supply reel; 47 is a take-up reel; 48 is a supply reel base; 49 is a take-up reel base; 50 is a base for positioning the tape cassette; and 51 is a slack sensor roller.

The guide plate 22 is provided with the horizontal guide slits 23 to 26, and it is attached at one end thereof to the chassis 7 and at the other end thereof to the cylinder base 1. A part of the one end of the guide plate 22 is located in the opening 45 of the tape cassette 44. The guide slits 23, 24 extend near from the opening 45 of the tape cassette 44 to the guide slits 52, 53 formed in the cylinder base 1, respectively. They terminate at the upstream side of the cylinder 6. The guide slits 24 and 53 are located closer to the cylinder 6 than the guide slits 23 and 52. In particular, the guide slit 53 is located very close to the cylinder 6. The guide slits 52 to 55 are shown in detail in FIG. 10. At the ends of the guide slits 52 and 53 on the upstream side of the cylinder 6, plate-like catchers 29 and 30 each having a V-shaped groove are mounted to the cylinder base 1. The guide base 35 mounting thereon the guide roller 10 and the guide base 36 mounting thereon the guide roller 8 as the upper limit guide are movably fitted in and among the guide slits 23 and 52, and 24 and 53. The guide bases 35 and 36 are to be located in the opening 45 of the tape cassette when they are at one end of their respective guide slits 23 and 24, as shown in FIG. 1, and are to be positioned by the respective catchers 29 and 30 at the ends of the guide slits 52 and 53, as shown in FIG. 2.

Likewise, the guide slits 25 and 26 also extend from near from the opening 45 of the tape cassette 44 to the guide slits 54 and 55 formed in the cylinder base 1, respectively. They terminate at the downstream side of the cylinder 6. The guide slits 25 and 54 are located closer to the cylinder 6 than the guide slits 23 and 52. In particular, the guide slit 54 is located very close to the cylinder 6. At the ends of the guide slits 54 and 55 on the downstream side of the cylinder 6, plate-like catchers 31, 32 each having V-shaped groove are mounted to the cylinder base 1. The guide base 38 mounting thereon the guide roller 11 and the guide base 37 mounting thereon the guide roller 9 as the upper limit guide are movably fitted in and along the guide slits 26 and 55, and 25 and 54. The guide bases 37 and 38 are to be located in the opening 45 of the tape cassette when they are at one end of their respective guide slits 25 and 26, as shown in FIG. 1, and are to be positioned by the respective catchers 31 and 32 at the ends of the guide slits 54 and 55, as shown in FIG. 2.

The guide plate 22 is parallel to the chassis 7 and has no tilt surfaces. Therefore, all of the guide slits 23 to 26 lie horizontally. The guide slits 52 and 55 formed in the cylinder base 1 also extend horizontally parallel to the chassis 7.

Figure 8:
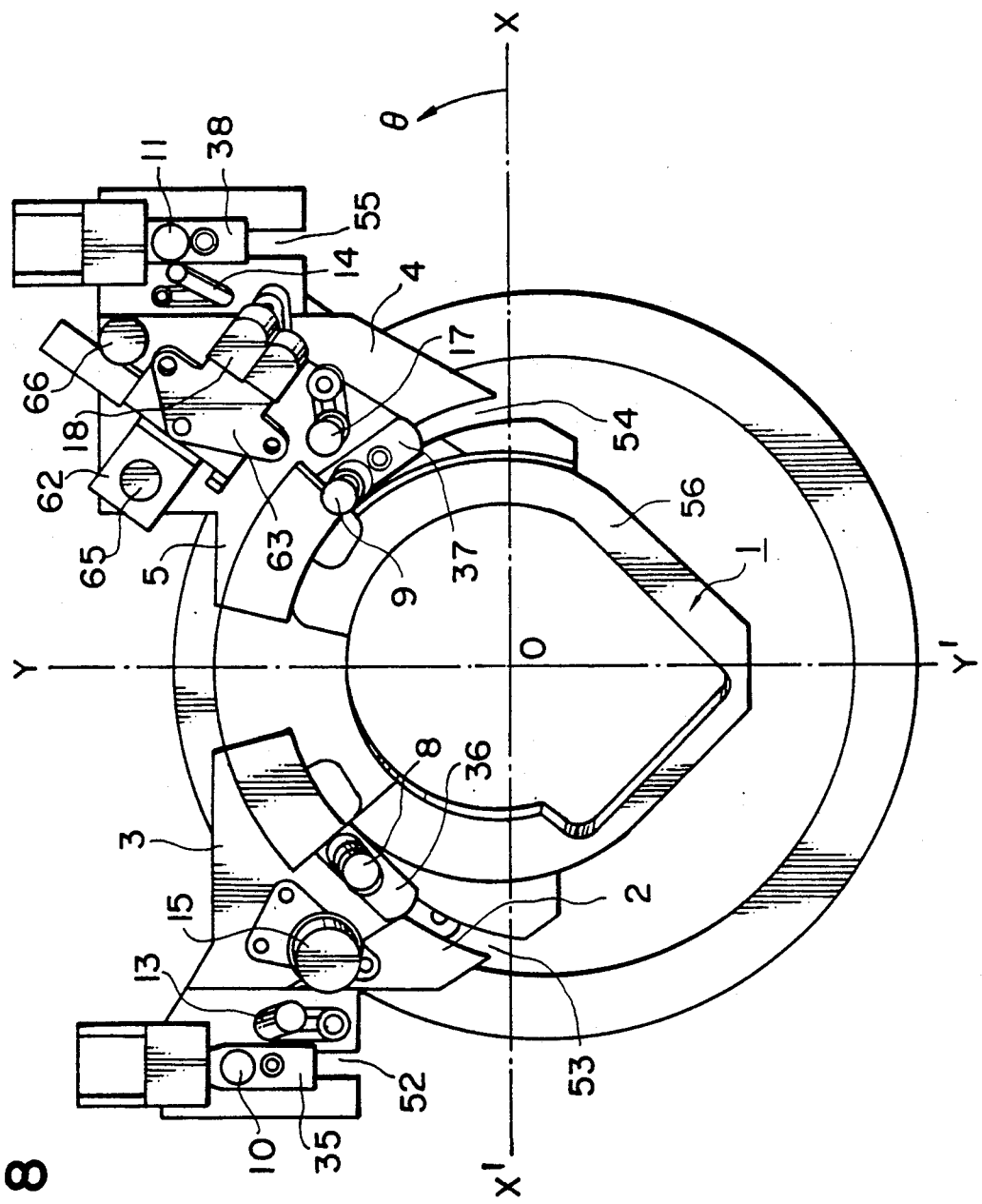
FIG. 8 is a plan view showing various guides in detail.
Figure 9:
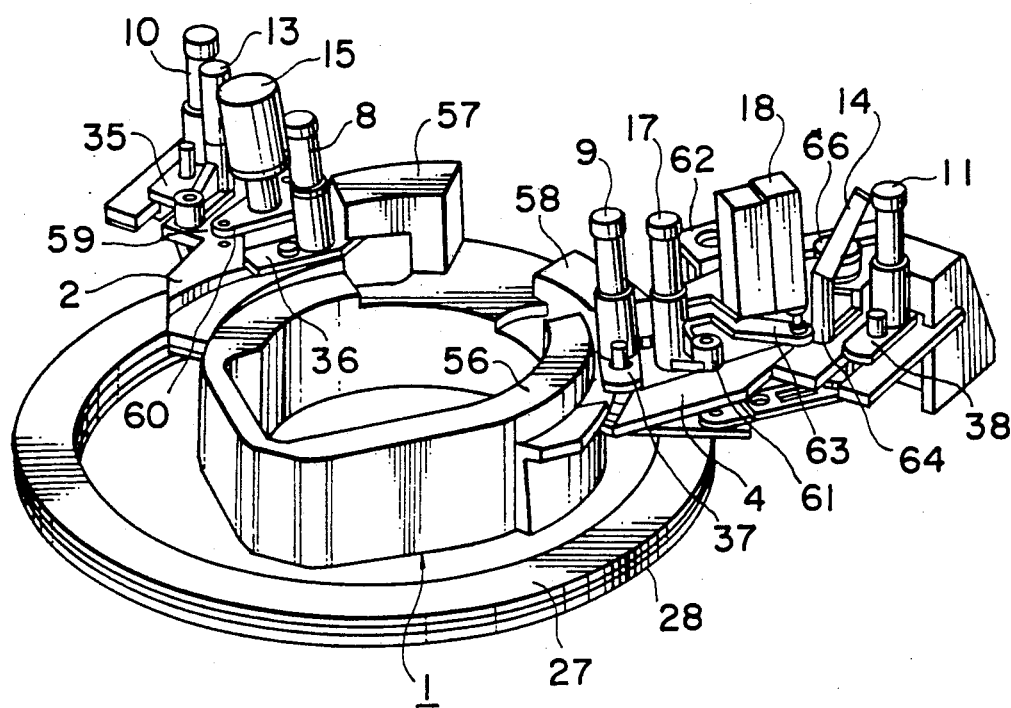
FIG. 9 is a perspective view showing the guides shown in FIG. 8.
Figure 10:
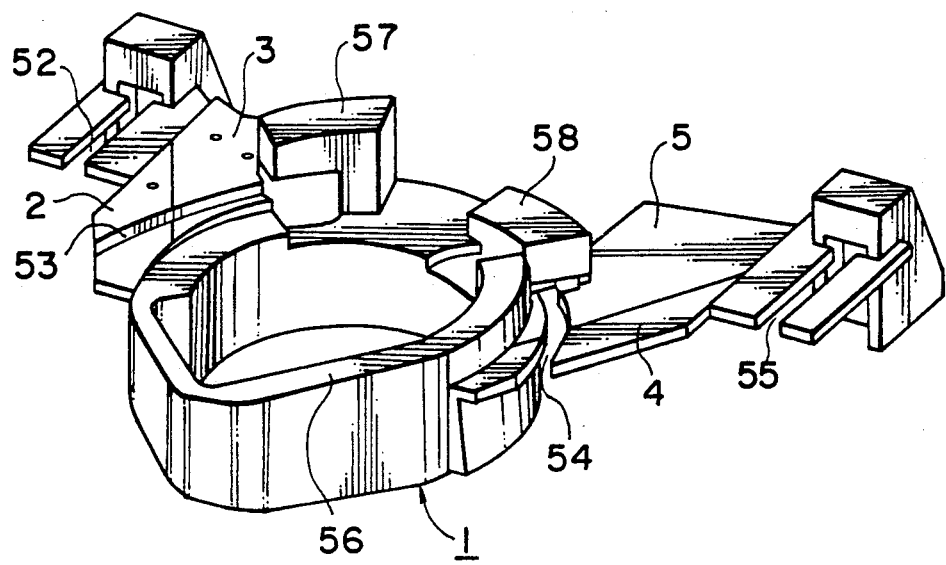
FIG. 10 is a perspective view showing components of the cylinder base.

Referring to FIGS. 8 to 10, a tilt surface 56 is formed such that the cylinder 6 has a tilt angle of 5.75° and the tilting direction of $\theta = 180°$. The $\theta$ is given by an angle measured counterclockwise from the X axis of the coordinates which are defined in the plan view of FIG. 8 such that the origin O is the center of the cylinder and a line connecting the centers of the supply reel base and the take-up reel base is the X axis.

Meanwhile, the part of the cylinder base 1 in which the guide slit 53 is provided is inclined by an inlet side first tilt surface 2 at an angle of 3.54° with respect to the surface of the chassis 7. Then, an inlet side second tilt surface 3 is inclined at an angle of 8.28° with respect to the surface of the chassis 7. This tilt angle of 8.28° is equal to an angle at which the guide roller 8 is to be inclined. The inlet side first tilt surface 2 and the inlet side second tilt surface 3 are set to have the tilting direction of $\theta = 210.81°$. This tilt direction angle $\theta = 210.81°$ is equal to a tilt direction angle at which the guide roller 8 is to be inclined.

Likewise, a part of the cylinder base 1 in which the guide slit 54 is provided is inclined downwardly by an outlet side first tilt surface 4 at an angle of 4.41° with respect to the surface of the chassis 7. Then, an outlet side second tilt surface 5 is inclined at an angle of 7.99° with respect to the surface of the chassis 7. The outlet side first tilt surface 4 and the outlet side second tilt surface 5 are set to have the tilting direction of $\theta = 151.1°$. This tilt direction angle $\theta = 151.1°$ is equal to a tilt direction at which the guide roller 9 is to be inclined.

Since the guide slits 23 to 26 and 52 to 55 thus formed, when the guide bases 35 to 38 are moved from the tape cassette 44, the guide bases 35, 38 are moved parallel to the chassis 7 along the guide slits 23 and 52, and 26 and 55, respectively. But, the guide base 36 is first moved parallel to the chassis 7 and then directed upwardly, while the guide bases 35, 36, 37 and 38 reach their stop positions defined by the catchers 29, 30, 31 and 32, respectively.

Construction of other guides will now be described. FIG. 9 shows a condition that the guide bases 35, 36, 37 and 38 are positioned by the catchers 29, 30, 31 and 32, respectively. The tilt guide 13 and the impedance roller 15 are mounted on the cylinder base 1 so as to be located between the guide rollers 10 and 8 under this condition. On the downstream side of the cylinder base 1, the guide roller 17, the AC head 18 and the tilt guide 14 are mounted on the cylinder base 1 so as to be located between the guide rollers 9 and 11. Here, the running path of the magnetic tape 12 is defined such that the tilting direction and the tilt angle of the impedance roller 15 become equal to those of the guide roller 8, and the tilting directions and the tilt angles of the guide roller 17 and the AC head 18 become equal to those of the guide roller 9, respectively. Therefore, the inlet side second tilt surface 3 is formed to spread over a wide area including the vicinity of the guide slit 53, permitting the impedance roller 15 to be erected on the inlet side second tilt surface 3. Further, the mounting area of the guide roller 8 and surroundings thereof, the mounting area of the impedance roller 15 and surroundings thereof, as well as a catcher surface 57 have the same tilt angle and the tilting direction as those of the inlet side second tilt surface 3. Accordingly, the above parts can be machined simultaneously with the cylinder base 1 so that dimensional accuracy of those parts in the tape running system can be improved easily. It is to be noted that an impedance roller base 60 is not only mounted in such a manner as allowing adjustment of a level of the impedance roller 15 with a lower limit flange by means of a screw, but also screwed at three points to the cylinder base 1 through respective springs so that the tilt angle and the tilting direction of the impedance roller base 60 may be finely adjusted dependent on actual tape running conditions.

The tilt guide 13 is fixed to a tilt guide base 59 and then integrally assembled to the horizontal surface of the cylinder base 1 by means of screws or the like. Thus, the tilt guide base 59 is a part which has a tilt surface (of a tilt angle of 14.85° and a tilting direction $\theta = 284.96°$). However, by inserting a spacer between the tilt guide base 59 and the cylinder base 1 on assembling, the tilt guide base 59 can be assembled with high accuracy while measuring actual accuracy of the tilt guide 13.

On the other hand, the outlet side second tilt surface 5 is formed to spread over a wide area including not only the vicinity of the guide slit 54 but surroundings thereof, permitting the guide roller 17 and the AC head 18 to be erected on the outlet side second tilt surface 5. A guide roller base 61, a first AC head base 62 and a second AC head base 63 are therefore not required to have their specific tilt surfaces. Further, the mounting area of the guide roller 9 and surroundings thereof, the mounting area of the guide roller 17 and surroundings thereof, the mounting area of the AC head 18 and surroundings thereof, as well as a catcher surface 58 have the same tilt angle and the tilting direction as those of the outlet side second tilt surface 5. Accordingly, the above parts can also be machined simultaneously with the cylinder base 1 so that dimensional accuracy of those parts in the tape running system can be improved easily. It is to be noted that a guide roller base 61 is not only mounted in such a manner as allowing adjustment of a level of the guide roller 17 with a lower limit flange by means of a screw or the like, but also assembled integrally to the outlet side second tilt surface 5 of the cylinder base 1 by means of screws or the like. Thus, the guide roller base 61 is a part which has no tilt surface. By inserting a spacer between the guide roller base 61 and the cylinder base 1 on assemblying, the guide roller base 61 can be assembled with high accuracy while measuring actual accuracy of the guide roller 17.

The AC head 18 is fixed onto and upright from the second AC head base 63. As shown in FIG. 8, too, the second AC head base 63 is screwed at three points to the first AC head base 62 through respective springs so that the Azimuth angle and the tilt angle of the AC head 18 with respect to the magnetic tape 12 may be finely adjusted. The first AC head base 62 is swingable on and vertically slidable along a shaft 65. Specifically, though not shown, the first Ac head base 62 is adapted at its end to abut with an adjusting nut 66, and adjusted vertically by means of a nut at an upper part of the shaft 65 while being biased vertically by a spring. The adjusting nut 66 has a conical shape and, as it is moved vertically, permits to finely adjust the phase and positional relationship between a video signal write-start position on the magnetic tape 12 and a control signal.

Further, the tilt guide 14 is fixed to a tilt guide base 64 and then integrally assembled to the horizontal surface of the cylinder base 1 through the base 64 by means of screws or the like. Thus, the tilt guide base 64 is a part which has a tilt surface (of a tilt angle of 33.95° and a tilting direction $\theta = 67.05°$). The tilt guide base 64 permits the assembly of tilt guide 14 with high accuracy.

The other construction of the tape loading mechanism will be described below. On the chassis 7, there are arranged two loading rings 27 and 28 capable of revolving round the cylinder 1 (via gearings, though omitted in the figures). These loading rings 27 and 28 are laid one on the other and can pass below the guide plate 22, and the inlet side first tilt surface 2, the inlet side second tilt surface 3, the outlet side first tilt surface 4 and the outlet side second tilt surface 5 of the cylinder base 1. The loading rings 27 and 28 are coupled via gearings to the loading motor 33 mounted on the chassis 7 so as to revolve in opposite directions. The revolution of the loading ring 27 moves the guide bases 35 and 36, while the revolution of the loading ring 28 moves the guide bases 37 and 38. In construction of this embodiment, a revolution angle of the loading ring 27 about the center of revolution is set to be approximately 108° clockwise, and a revolution angle of the loading ring 28 is set to be approximately 120° counterclockwise. A small magnet is secured to the lower surface of the loading ring 28, while a sensor substrate 67 having a sensor, such as a Hall element, is secured to the chassis 7. The sensor detects the small magnet to determine the timing at which the loading rings 27 and 28 are to be stopped.

On a side of the supply reel 46 of the tape cassette 44, the tension lever 39 is pivotable on a shaft 69 on a tension plate 68. The tension roller 21 is rotatably mounted to the distal end of the tension lever 39. The rollers 74 and 75 are rotatably mounted to the guide plate 22 and arranged such that the tension roller 21 is adapted to be positioned therebetween.

On a side of the take-up reel 49 of the tape cassette 44, the worm wheel 42 is disposed to be driven by the pinch roller drive motor 43 for rotation, and the pinch roller arm 40 is supported by a bearing 70 provided on the shaft to which the worm wheel 42 is mounted. A drive pin 41 planted on the pinch roller arm 40 is engaged with the worm wheel 42 through a torsion spring. The pinch roller 19 is rotatably supported on the distal end of the pinch roller arm 40. When the pinch roller drive motor 43 is driven to make the pinch roller arm 40 pivot clockwise on the bearing 70, the pinch roller 19 is tightly contacted with the capstan 20.

The slack sensor roller 51 is born rotatably with respect to a sensor arm 71. The sensor arm 71 is normally biased counterclockwise by a spring and rotatably engaged with a sensor plate 73 fixed at a bearing 72 to the chassis 7.

A full-width eraser head 76 and the impedance roller 16 are mounted to the guide plate 22 through a base.

The positioning base 50 is fixed to the chassis 7 by pins 79 and 80. The positioning base 50 is engaged with the tape cassette 44 through pins 77 and 78 for properly positioning the tape cassette 44.

Next, operation of this embodiment will be described.

There will first be explained an unloaded condition where the tape cassette 44 is just fitted. The supply reel 46 of the tape cassette 44 is rested on the supply reel base 48 rotatably mounted on the chassis 7, while the take-up reel 47 is rested on the take-up reel base 49. The magnetic tape 12 is stretched between the supply reel 46 and the take-up reel 47 within the tape cassette 44. The guide rollers 10, 8, 9 and 11 on the guide bases 35, 36, 37 and 38, the tension roller 21 on the tension lever 39, and the pinch roller 19 on the pinch roller arm 40 are located in the opening 45 of the tape cassette 44 at inside of the magnetic tape 12.

When the loading operation is started under the above condition, the loading ring 28 is revolved clockwise by the loading motor 33 so that the guide bases 37 and 38 are moved along the guide grooves 25 and 54, and 26 and 55, respectively, while the loading ring 27 is revolved counterclockwise so that the guide bases 35 and 36 are moved along the guide grooves 23 and 52, and 24 and 53, respectively.

As the loading ring 27 revolves counterclockwise, the tension lever 39 is swung counterclockwise. With some time lag, the pinch roller arm 40 is swung clockwise by the pinch roller drive motor 43.

Upon movement of the guide bases 35, 36, 37 and 38, the guide rollers 10, 8, 9 and 11 mounted thereon are brought into contact with the magnetic tape 12 in the tape cassette 44, to thereby withdraw the magnetic tape 12 out of the tape cassette 44. At this time, the tension roller 21 and the pinch roller 190 have no contribution to withdraw the magnetic tape 12.

Afterward, the guide bases 35, 36, 37 and 38 reach the respective catchers 29, 30, 31 and 32 and then are positioned, thereby the magnetic tape 12 is helically wound round the outer peripheral surface of the cylinder 6 over a range of predetermined angle. The loading operation is thus completed. The magnetic tape 12 is wound along a helical tape lead portion on the outer peripheral surface of the cylinder 6.

Figure 4:
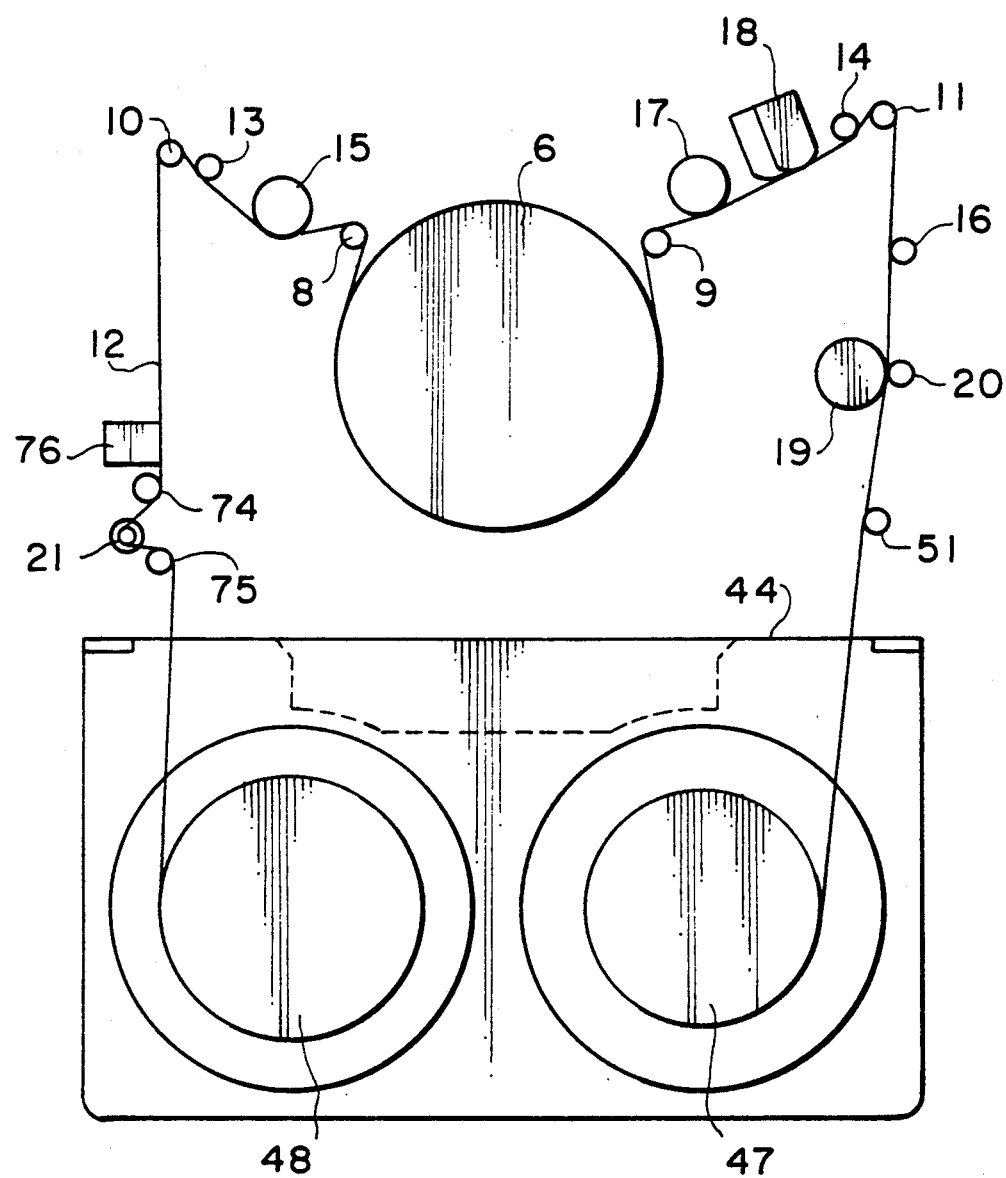
FIG. 4 is a plan view showing a tape running path in the embodiment.

FIG. 4 shows the running path of the magnetic tape in a loaded condition thus obtained.

The magnetic tape 12 is led out from the supply reel 46 to be contacted with the roller 75, the tension roller 21 and the roller 74, and thereafter comes into contact with the full-width eraser head 76. Afterward, the guide roller 10 changes the running direction of the magnetic tape 12 toward the cylinder 6. The tape face of the magnetic tape 12 is inclined by the tilted guide 13 according to an inclination of the cylinder 6, and contacts with the impedance roller 15. After the tape lower edge is restricted by a lower flange of the impedance roller 15, the magnetic tape 12 comes into contact with the cylinder 6 via the guide roller 8 as an upper limit guide. While running round the cylinder 6, the magnetic tap 12 is restricted at its lower edge by the tape lead portion of the cylinder.

On the downstream side of the cylinder 6, the magnetic tape 12 from the cylinder 6 first comes into contact with the guide roller 9 as an upper limit guide, and then contacts with the guide roller 17 as a lower limit roller and the AC head 18. Afterward, the tilt guide 14 makes the tape face vertical with respect to the chassis 7, and the guide roller 11 changes the running direction of the magnetic tape toward the tape cassette 44. At this time, the guide roller 11 also serves to restrict the upper edge of the magnetic tape 12. The magnetic tape 12 thus changed in the running direction contacts with the impedance roller 16 while being thereby restricted at its lower edge. Thereafter, the magnetic tape 12 passes between the pinch roller 19 and the capstan 20, comes into contact with the slack sensor roller 51, and is then taken up by the take-up reel 47 of the tape cassette 44.

When the aforesaid tape running path is established and the capstan 20 is rotated by the capstan motor 34, the magnetic tape 12 tightly sandwiched between the pinch roller 19 and the capstan 20 is caused to run along the above running path. At this time, the tension roller 21 detects back tension of the magnetic tape, and the load corresponding to the detected result is applied to the supply reel 46 so that the tape tension is controlled to become a predetermined value. On the other hand, between the capstan 20 and the take-up reel 47, the slack sensor roller 51 determines whether the rotational speed of the take-up reel 47 is proper or not, for thereby controlling the take-up rate of the magnetic tape 12.

Figure 11:
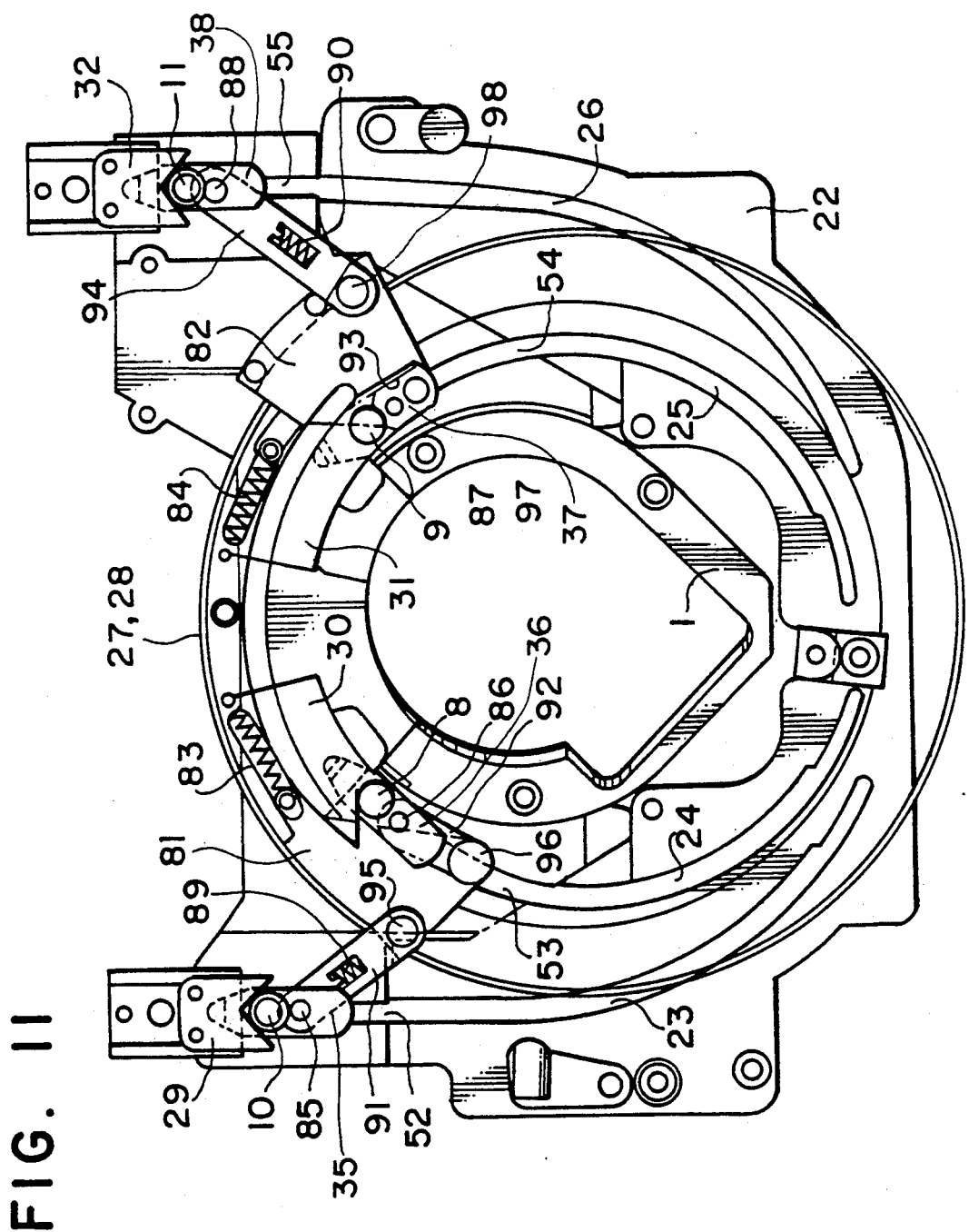
FIG. 11 is a plan view showing a detailed contact state of guide bases shown in FIG. 2.
Figure 12:
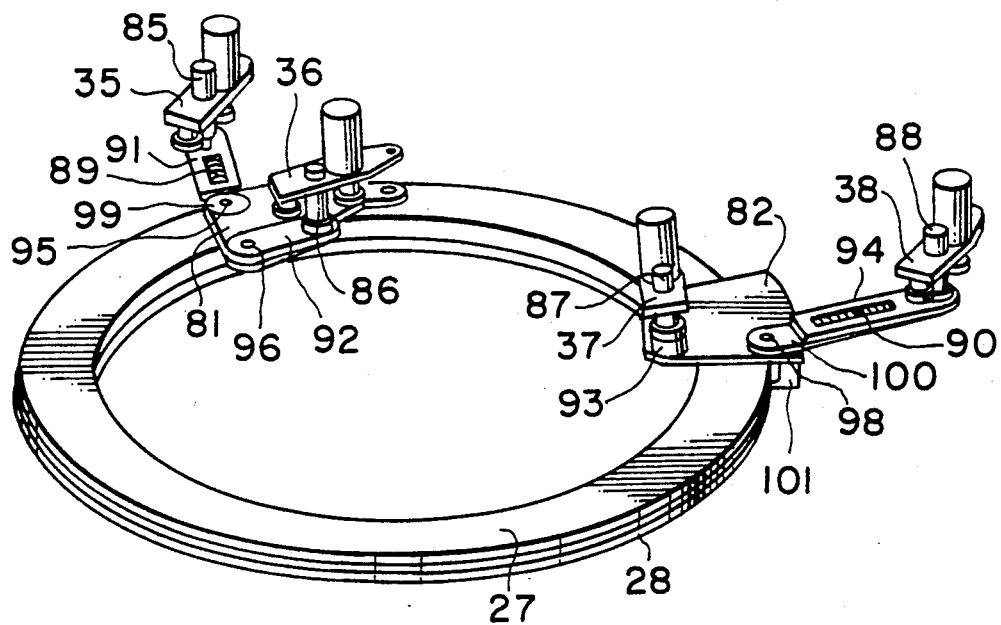
FIG. 12 is a perspective view showing a part the guide bases shown in FIG. 11.

Referring to FIGS. 11 and 12, under a loaded condition, the guide bases 35, 36, 37 and 38 are pressed against and positioned by the respective V-shaped engagement portions of the catchers 29, 30, 31 and 32. The guide base 36 is pressed against a pin 86 planted on a loading lever 92 which is moved below the cylinder base 1 upon rotation of the loading ring 27. The pin 86 is fitted in the guide slit 24 of the guide plate 22. Thus, as the loading ring 27 rotates, the guide base 36 is moved along the guide slit 24 and the guide slit 53 formed in the cylinder base 1. The guide base 35 is also moved in a like manner to the guide base 36. Under a loaded condition, the guide roller 10 is set vertical with respect to the chassis 7, but the guide roller 8 is inclined with respect to the chassis 7.

The guide slit 53 of the inlet side second tilt surface 3 shown in FIG. 10 is set to have such a length that the guide base 36 is in its full size located to just occupy the whole guide slit 53 under a loaded condition. Meanwhile, the inlet side first tilt surface 2 is formed so as not to damage the edge of the magnetic tape 12 due to an abrupt change in the attitude of the guide base 36 during the loading process. However, it is not necessary to subdivide the configuration of the guide slit 53 into still narrower tilt surfaces or more intricate curves. The reasons are in that there exists no substantial difference in the movement path of the guide base 36 dependent on the modified configurations of the guide slit 53, that the cylinder base 1 can otherwise be manufactured easily, and that the larger overall length of the guide base 36 is advantageous in improving the positioning accuracy.

The foregoing also equally applies to the guide bases 37 and 38 on the downstream side of the cylinder 6.

In FIGS. 11 and 12, the element designated at a reference numeral 81 is a loading holder; 95 and 96 are support shafts; 92 is a loading lever; 91 is an upper loading lever; 99 is a lower loading lever; 85 and 86 are pins; 83 is a tension spring; and 89 is a compression spring.

A loading holder 81 is engaged with the loading ring 27 in such a manner that the loading holder 81 can be moved over a predetermined distance (e.g., about 3 mm) in the lengthwise direction thereof.

The tension spring 83 is disposed between the distal end of the loading holder 81 and the loading ring 27. The loading holder 81 is biased by the tension spring 83 on the loading ring 27 in the same direction (clockwise in the figure) of rotation thereof during the loading operation.

The loading holder 81 has two support shafts 95 and 96 planted thereon, to which the lower loading lever 99 and the loading lever 92 are pivotaly mounted, respectively. The loading lever 92 has the pin 86 planted thereon, with which the guide base 36 is engaged. On the other hand, the upper loading lever 91 is slidably attached to the lower loading lever 99 so as to produce compression reaction, which is biased into a stretched state by the spring 89. The upper loading lever 91 has at its distal end the pin 85 planted thereon, with which guide base 35 is engaged. The pin 85 is fitted in the guide slit 23 of the guide plate 22 and the guide slit 52 of the cylinder base 1.

When the loading ring 27 is revolved upon start of the loading operation, the loading holder 81 lying on the loading ring 27 is also moved while being biased by the tension spring 83, whereupon the guide base 35 and 36 are moved along the guide slit 23 and 52, and 24 and 53 while being pushed by the loading lever 92 and the upper and lower loading levers 91 and 99, respectively. The guide base 35 is first fitted into the V-shaped engagement portion of the catcher 29, but the loading ring 27 further continues to revolve. As a result, the compression spring 89 is compressed so that the guide base 35 comes into press contact with the catcher 29. The guide base 36 is then fitted into the V-shaped engagement portion of the catcher 30. The loading ring 27 is further moved through about 3 mm and then stopped. Once the guide rollers 10 and 8 are brought into contact with the catchers 29 and 30, respectively, the loading holder 81 can no longer move. But, only the loading ring 27 is thereafter moved through the above distance so that the tension spring 83 is stretched. The increased biasing force of the tension spring 83 thus stretched causes the guide rollers 10 and 8 to come into press contact with the catchers 29, 30, respectively, thereby fixing their attitudes. At this time, the guide bases 35 and 36 undergo the moment incidental to the above press contact via the pins 85 and 86 with the V-shaped grooves of the catchers 29 and 30 serving as fulcra, respectively. The distal ends of the guide bases 35 and 36 are thereby brought into press contact with the lower surface of the cylinder base 1 in the same areas as where the catchers 29 and 30 are fixed to the upper surface of the cylinder base 1.

Meanwhile, on the downstream side of the tape running path with respect, to the cylinder 6, the element designated at guide roller 9 by reference numeral 82 is an upper loading holder; 101 is a lower loading holder; 97 and 98 are support shafts; 93 is a loading lever; 94 is an upper loading lever; 100 is a lower loading lever; 87 and 88 are pins; 84 is a tension spring and 90 is a compression spring.

As shown in FIGS. 11 and 12, the difference between the downstream loading mechanism and the upstream loading mechanism along the tape running path resides only in that the upper loading holder 82 is fixed to the lower loading holder 101 and similarly engaged with the loading ring 28 through the lower loading holder 101 on the downstream side. The detailed description of the downstream loading mechanism is therefore omitted.

In FIGS. 11 and 12, since the loading holders 81, 82 and 101 are movable with respect to the loading rings 27 and 28 through the tension springs 83 and 84, respectively, the difference in strokes until establishment of the aforesaid press contact of the guide rollers between the upstream and downstream sides can be absorbed. Also, since the upper loading lever 91 and the lower loading lever 99 are movable with respect to the loading lever 92 through the compression spring 89, it becomes possible to absorb the difference in strokes until establishment of the press contact of the guide rollers 10 and 8 due to such factors as dimensional errors of the respective levers. Likewise, since the upper loading lever 94 and the lower loading lever 100 are movable with respect to the loading lever 93 through the compression spring 90, it becomes possible to absorb the difference in strokes until establishment of the press contact of the guide rollers 9 and 11.

FIG. 4 shows the tape running path in a loaded condition thus obtained. The components shown in FIG. 4 corresponding to those in FIGS. 1 to 3 are designated by the same reference numerals.

In FIG. 4, the magnetic tape 12 is led out from the supply reel 46 to be contacted with the roller 75, the tension roller 21 and the roller 74, and then comes into contact with the full-width eraser head 76. Afterward, the guide roller 10 changes the running direction of the magnetic tape toward the cylinder 6. The magnetic tape 12 thus changed in the running direction is inclined in its tape face by the tilt guide 13 according to an inclination of the cylinder 6, and contacts with the impedance roller 15. Thereafter, the magnetic tape comes into contact with the cylinder 6 through the guide roller 8.

On the downstream side with respect to the cylinder 6, the magnetic tape 12 from the cylinder 6 first comes into contact with the guide roller 9, and then contacts with the guide roller 17 and the AC (audio and control) head 18. Afterward, the tilt guide 14 makes the tape face vertical with respect to the chassis 7 (FIG. 1), and the guide roller 11 changes the running direction of the magnetic tape toward the tape cassette 44. The magnetic tape 12 thus changed in the running direction contacts with the impedance roller 16, and passes between the pinch roller 19 and the capstan 20 and then comes into contact with the slack sensor roller 51 for being taken up by the take-up reel 47 of the tape cassette 44.

Thus, the tape running path is established and the magnetic tape 12 is tightly sandwiched between the pinch roller 19 and the capstan 20. When the capstan 20 is rotated by the capstan motor 34 under such condition, the magnetic tape 12 runs along the above running path. At this time, the tension roller 21 detects tension of the magnetic tape. The load corresponding to the detected value of tape tension is applied to the supply reel 46 so that the tape tension value is held at a predetermined constant value.

The tilt guide 13 is inclined with respect to the surface of the chassis 7 (hereinafter referred to as chassis surface), whereby the running path of the magnetic tape 12 is changed from the direction parallel to the chassis surface until the guide roller 10 to the upward direction. The magnetic tape 12 thus changed in the running direction is contacted with the impedance roller 15 and then again changed in the running direction by the guide roller 8 so as to now gradually is, thereby coming into contact with the outer peripheral surface of the cylinder 6. While running round the outer peripheral surface of the cylinder 6, the magnetic tape 12 is kept at its lower edge smoothly contacted with the tape lead portion of the cylinder 6 without causing undue forces.

In order to run the magnetic tape 12 on the upstream side with respect to the cylinder 6 as mentioned above, the level and the running direction of the magnetic tape 12 are restricted by the guide roller 8 between the guide roller 8 and the tape lead portion of the cylinder 6 such that the lower edge of the magnetic tape 12 lies on an extension of the tape lead portion.

Further, the guide roller 8 is inclined with respect to the chassis surface so as to change the tape running direction directed upwardly from the tilt guide 13 to the downward direction parallel to the tape lead portion as stated above. Specifically, when the upstream guide base 36 is positioned by the catcher 30, the attitude of the guide roller 8 is thereby set such that it is erect perpendicularly to the plane including the ascending tape running path and the descending tape running path in front and rear of the guide roller 8. This permits the guide roller 8 to change the tape running direction as mentioned above, while not causing any force acting on the magnetic tape 12 in the widthwise direction thereof. The guide roller 8 is positioned close to the cylinder 6, while the tilt guide 13 is located sufficiently away from the cylinder 6 and disposed between the guide roller 10 and the guide roller 8. Therefore, the tilt guide 13 and the guide roller 8 are sufficiently remote from each other, so that an ascending slope of the tape running path due to the tilt guide 13 becomes small and the running direction change other than an ascent of magnetic tape is not required. This makes it possible to set the tilt angle of the tilt guide 13 small and also the tape winding angle over the tilt guide 13 small. As a result, the force offered by the tilt guide 13 and acting on the magnetic tape 12 in the widthwise direction thereof becomes very small.

The above explanation is also equally applicable to the downstream side of the cylinder 6. Specifically, when the downstream guide base 37 is positioned by the catcher 31 close to the cylinder 6, the magnetic tape 12 departing downwardly from the cylinder 6 is caused by the guide roller 9 to now run upwardly. To this end, the attitude of the guide roller 9 is set such that it is erect perpendicularly to the plane including both the tape running paths in front and rear of the guide roller 9. This allows the guide roller 9 not to cause any force acting on the magnetic tape 12 in the widthwise direction thereof. Also, the magnetic tape 12 running upwardly from the guide roller 9 is changed in its running direction by the tilt guide 14 so that it now runs parallel to the chassis surface. Simultaneously, the level of the magnetic tape 12 running parallel to the chassis surface is made equal to the level of the magnetic tape 12 on the upstream side of the cylinder 6. This level restriction is performed by the guide roller 11. Here, the distance between the guide roller 9 and the tilt guide 14, through which the magnetic tape 12 is run upwardly, is sufficiently long. Therefore, it is possible to set sufficiently small an ascending slope at which the magnetic tape runs upwardly. Thus, the tilt angle of the tilt guide 14 necessary for changing the ascending running direction of the magnetic tape 12 to the parallel direction with respect to the chassis surface becomes very small. Also, any change in the tape running direction other than the above direction change is not required, and the tape winding angle over the tilt guide 14 can also be made sufficiently small. As a result, the force produced by the tilt guide 14 and acting on the magnetic tape 12 in the widthwise direction thereof becomes very small.

In conventional VCRs, because the tilt guides are positioned close to the cylinder and the running direction of the magnetic tape is largely changed so as to follow the tape lead portion of the cylinder, it has been required to set both the tilt angles of the tilt guides and the tape winding angles over the tilt guides large. In this embodiment, however, not only the tilt angles of the tilt guides but also the tape winding angles over the tilt guides can be set small. This also makes the force offered by the tilt guides for pushing the tape up or down small. Accordingly, the force pressing the tape edge against the guide rollers and the tape lead portion of the cylinder becomes so small that the magnetic tape can be protected from damage.

Next, the tape loading process will be described. In the tape loading mechanism, as mentioned above, there arise such problems due to the attitude of the magnetic tape during the tape loading process as damage of the tape edge, lift-up of the magnetic tape at various tape guide members, and slack of the magnetic tape. If the magnetic tape is withdrawn out of the tape cassette parallel to the chassis surface and then brought into contact with an outer peripheral surface vertical to the chassis surface while being kept parallel to the chassis surface without change in the tape running direction, the above problems would not occur. In practice, however, because the cylinder is inclined with respect to the chassis surface and the magnetic tape must be helically wound round the cylinder so as to lie higher on the upstream side and lower on the downstream side under a loaded condition, the magnetic tape is in contact with the cylinder and the attitude thereof is also changed during the tape loading process, thereby producing the above problems.

In order to restrain such change in the attitude of the magnetic tape during the tape loading process, this embodiment is constituted such that the passages of the guide rollers 10 and 8 on the upstream side (as well as on the downstream side) are set separately from each other. Thus, the tape loading process is divided into a plurality of steps each of which represent a divided location. Then, the shift amount of the tape level is derived by loading simulation (tape attitude analysis program) for each of the divided locations, thereby allowing the passages of the guide bases 36 and 37 in the guide plate 22 as well as the motional relationship between the guide bases 35 and 36, and the guide bases 37 and 38 to be determined so that each of the shift amounts of the tape level for the respective divided locations become minimum. Incidentally, the guide bases 35 and 38 are moved parallel to the chassis surface.

Figure 5:
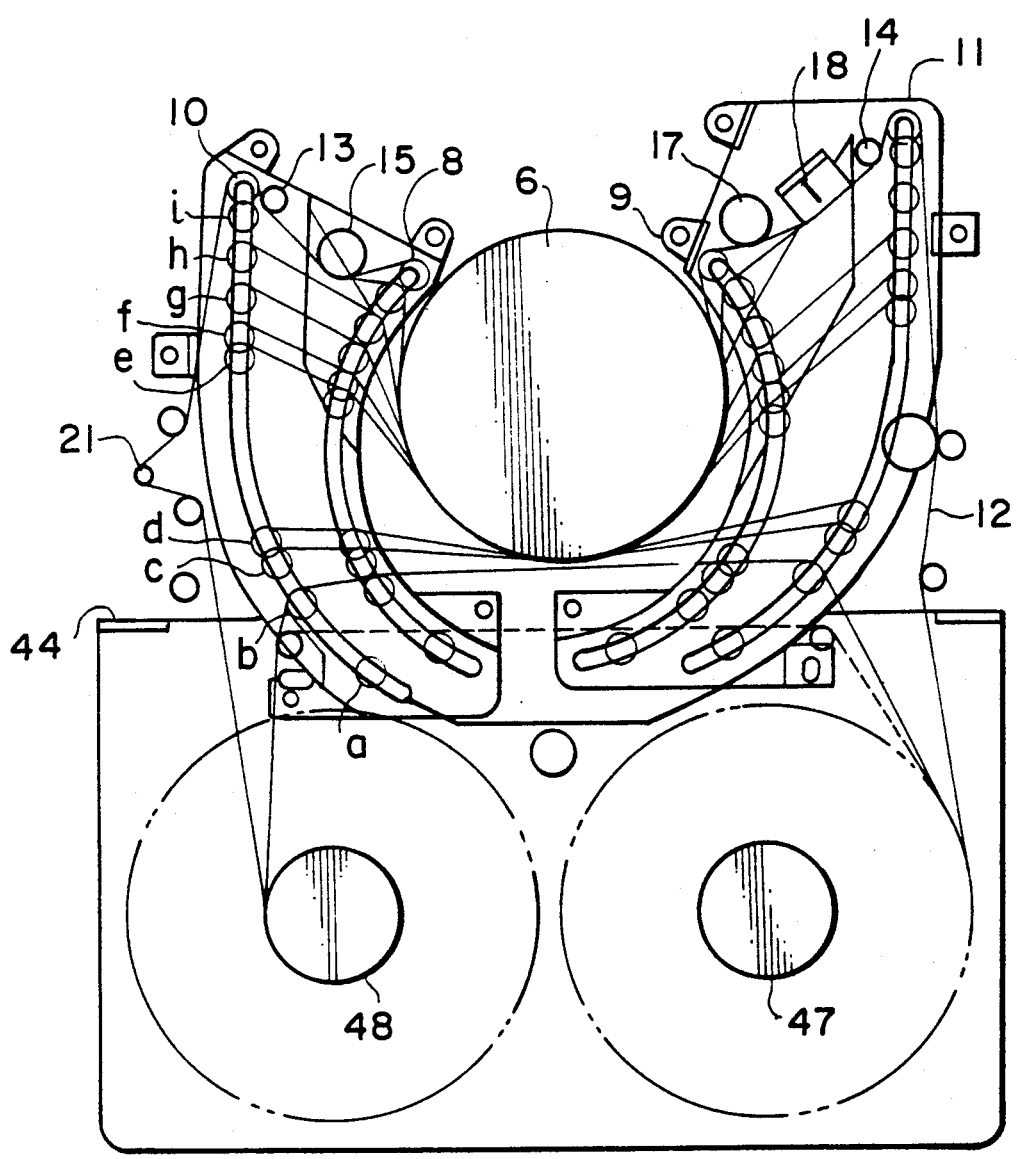
FIG. 5 is an illustration showing a tape loading process in the embodiment.

FIG. 5 shows thus-determined withdrawn conditions of the magnetic tape at the respective divided locations during the loading process.

In FIG. 5, conditions of the magnetic tape 12 withdrawn out of the tape cassette 44 according to the movement of the guide rollers 8 and 9, and the guide rollers 10 and 11 are represented in order of the divided locations a, b, . . . , i. Here, the location a represents an unloaded condition where the guide rollers 8 and 9, and the guide rollers 10 and 11 are positioned in the opening of the cassette tape 44 inside of the magnetic tape 12. The locations b-d represent conditions of the magnetic tape 12 before and after it has been withdrawn out of the tape cassette 44 and comes into contact with the cylinder 6. The locations e-g represent conditions of the magnetic tape 12 before and after the upstream guide bases 36 and 37 reach slopes of the first tilt surfaces 2 and 4 of the cylinder bases 1, respectively.

Figure 6:
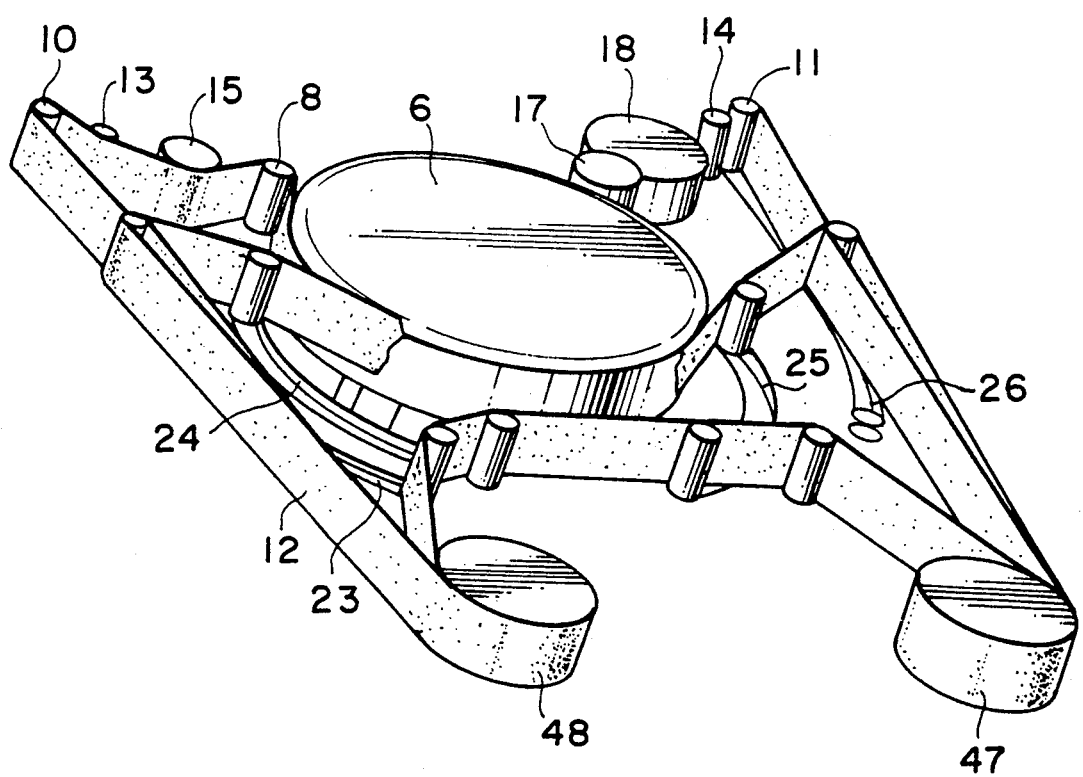
FIG. 6 is a perspective view showing the tape loading process based on CAD (Computer Aided Design) in three dimensions.

FIG. 6 shows the tape loading process of FIG. 5 in three dimensions based on CAD.

Figure 7:
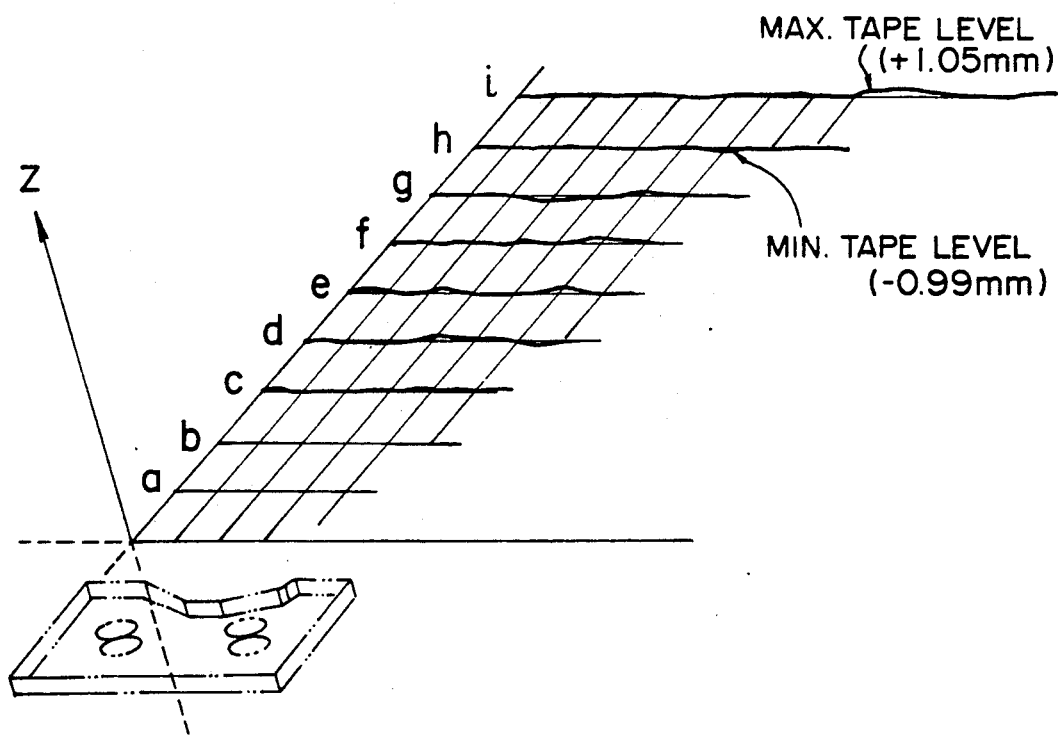
FIG. 7 is an illustration showing the result calculated by a loading simulator on shift amounts of a tape level during the tape loading process.

FIG. 7 illustrates the shift amounts of the tape level at the respective locations a, b, c, . . . , i in FIG. 5 under conditions that the configurations of the tilt surfaces 2, 3, 4 and 5 of the cylinder base 1 as well as the motional relationship between the guide rollers 10 and 11, and the guide rollers 8 and 9 are set optimum for the attitude of the magnetic tape. The result of FIG. 7 was derived by computer simulation. In FIG. 7, the X direction coincides with the lengthwise direction of the magnetic tape extending from the supply reel 46 to the take-up reel 47, and the Z direction coincides with the shift direction of the tape level. The result of computer simulation is as follows. Specifically, at the locations a-c before the magnetic tape 12 starts contacting with the cylinder 6, the shift amounts of the tape level are substantially zero. After that, there occurs a shift of the tape level. As shown in FIG. 7, however, the maximum shift amounts of the tape level in the positive and negative directions are +1.05 mm (the location i) and −0.99 mm (the location h), respectively. In other words, the shift amounts of the tape level throughout the tape loading process are held less than ±1 mm. This value is greatly improved as compared with the value of ±6 mm in the prior art.

In this embodiment, the guide rollers 10 and 11 moving on the outer side are arranged to move parallel to the chassis surface. But, these guide rollers 10 and 11 may be three-dimensionally arranged in such a manner as to move upwardly and downwardly, respectively, as the guide rollers 8 and 9 do. With such arrangement, while the guide plate and the tilt surfaces of the cylinder base are complicated in their configuration, the degree of freedom in surface configuration of the respective tilt parts is increased. Also, the shift amount of the tape level is further improved. Note that in this case, it is preferable to move the guide rollers 10 and 11 movable on the outer side ahead of the guide rollers 8 and 9 movable on the inner side.

Although the above-described embodiment is arranged as providing one guide roller on each guide base, it is also possible that two guide rollers are provided on each guide base, or that a fixed guide is provided in combination with the guide roller.

In the arrangement where the tilt guide having a small tilt angle is disposed nearest to the cylinder, for example, the running direction of the magnetic tape is changed in the nearest vicinity of the cylinder so that the attitude of the magnetic tape is changed with respect to the magnetic head provided on the rotatable cylinder. This is advantageous to optimally adjust a so-called touch or contact state between the magnetic head and the magnetic tape.

Next, a drive mechanism of the pinch roller will be described. FIGS. 1 to 3, the element designated at a reference numeral 142 is a plate; 140 is a worm; 70 is a bearing; 41 is a drive lever; and 141 is a gear train.

In FIGS. 1 to 3, the plate 142 is provided with a shaft erected thereon, and the worm wheel 42 is mounted on that shaft through a bearing 70. Accordingly, the worm wheel 42 is rotatable about that shaft. The pinch roller arm 40 is mounted to the bearing 70. The drive lever is planted on the worm wheel 42 and has its distal end coupled to the pinch roller arm 40. This causes the pinch roller arm 40 and the worm wheel 42 to rotate together. The pinch roller 19 formed of neoprene rubber or the like is rotatably born at the distal end of the pinch roller arm 40 through a bearing. This bearing has the automatic centering structure where the center shaft of the pinch roller 19 is supported by a single ball bearing. The worm wheel 42 is coupled to the pinch roller drive motor 43 through the gear train 141 and the worm 140.

When the pinch roller arm 40 is at such a state as shown in FIG. 1 under an unloaded condition, the loading operation is started and the pinch roller drive motor 43 subsequently is actuated, causing the pinch roller arm 40 to be swung clockwise about the bearing 70. Under a loaded condition, as shown in FIG. 2, the self-lock function between the worm 140 and the worm wheel 42 continuously produces a press force for pressing the pinch roller 19 against the capstan 20, even after the pinch roller drive motor 43 is deenergized.

The above pinch roller drive mechanism can present the following advantages:

(1) The accurate and appropriate press force for pressing the pinch roller 19 against the capstan 20 is easily obtained by controlling the drive voltage applied to the pinch roller drive motor;

(2) No solenoid is required and power consumption is hence saved. Also, the peak current becomes lower. Therefore, even when power is interrupted for some abnormal event while the pinch roller is kept in a pressure contact state, in particular, the pinch roller drive motor can be energized through discharge of a capacitor of small capacitance so that the pinch roller is easily released from its pressure contact state with the capstan. This prevents such drawbacks as deformation of the pinch roller and slack of the magnetic tape; and (3) Since the pinch roller drive system is independent from the loading system, the load of the loading motor is alleviated and the loading time is shortened.

Figure 14:
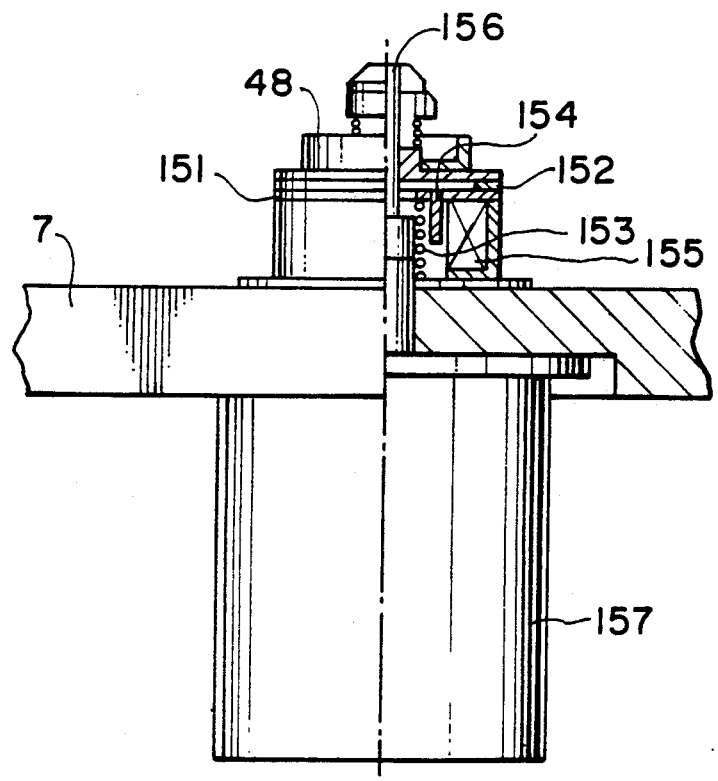
FIG. 14 is a partially sectional view showing a reel base mechanism shown in FIG. 1.

FIG. 14 shows a partial section of the construction of a reel base mechanism employed in FIGS. 1 to 3. FIG. 14 illustrates the structure on the take-up up side by way of example. The supply side has the same structure as the take-up side shown in FIG. 14 does. In the figure, the element designated at a reference numeral 151 is a brake plate; 152 is a brake shoe; 153 is a spring; 154 is a rotation checking stopper; 155 is a coil, 156 is a rotatable shaft; and 157 is a reel motor.

In the reel base mechanism shown in FIG. 14, the reel base 48 is directly driven by the reel motor 157, and the brake plate 151 concentric with the reel base 48 is used as a main brake (holder brake), thereby constituting a disk brake type mechanism which is adaptable for quick switching of mode and achievement of higher reliability.

More specifically, the reel motor 157 mounted to the lower surface of the chassis 7 has its rotatable shaft 156 projecting above the chassis 7. The reel base 48 is press fitted over the upper end of the rotatable shaft 156. Between the reel base 48 and the chassis 7, there is disposed the disk-like brake plate 151 facing the lower surface of the reel base 48. The brake shoe 152 is annually fixed to the upper surface of the brake plate 151 about the rotatable shaft 156. The brake plate 151 is biased toward the reel base 48 by a spring 153 fitted around the rotatable shaft 156. Further, the brake plate 151 is controlled by the rotation checking stopper 154 in such a manner that it can be displaced in an axial direction with respect to the stationary part, but cannot be rotated about the rotatable shaft 156. In addition, between the brake plate 151 and the chassis 7, there is disposed the coil 155 about the rotatable shaft 156.

When the coil 155 is not energized, the brake plate 151 is raised up by a biasing force of the spring 153 so that the brake shoe 152 is pressed against the lower surface of the reel base 48 to brake the reel base 48. When the coil 155 energized, there is produced is an electromagnetic force to attract the brake plate 151 toward the coil 155 against the biasing force of the spring 153, whereby the brake shoe 151 is disengaged from the lower surface of the reel base 48 to release the reel base 48.

Thus, during a tape running mode, the coil 155 is energized to release the brake, and the reel motor 157 is driven for rotating the reel base 48. When the magnetic tape is to be stopped, the reel motor 157 is deenergized and simultaneously the coil 155 is also deenergized. The brake is thereby applied at once.

Figure 13A:
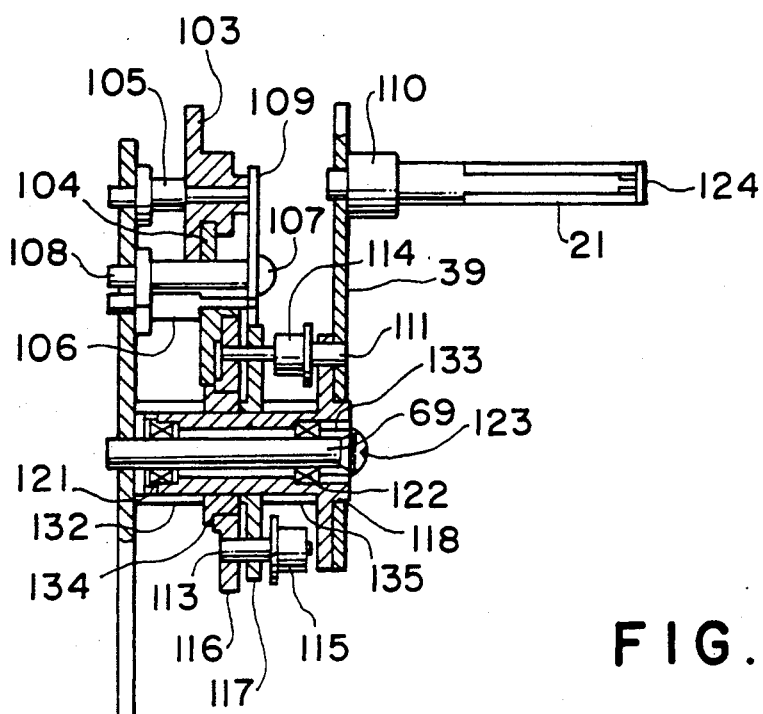
FIG. 13A is a side view showing a tape tension detecting mechanism.
Figure 13B:
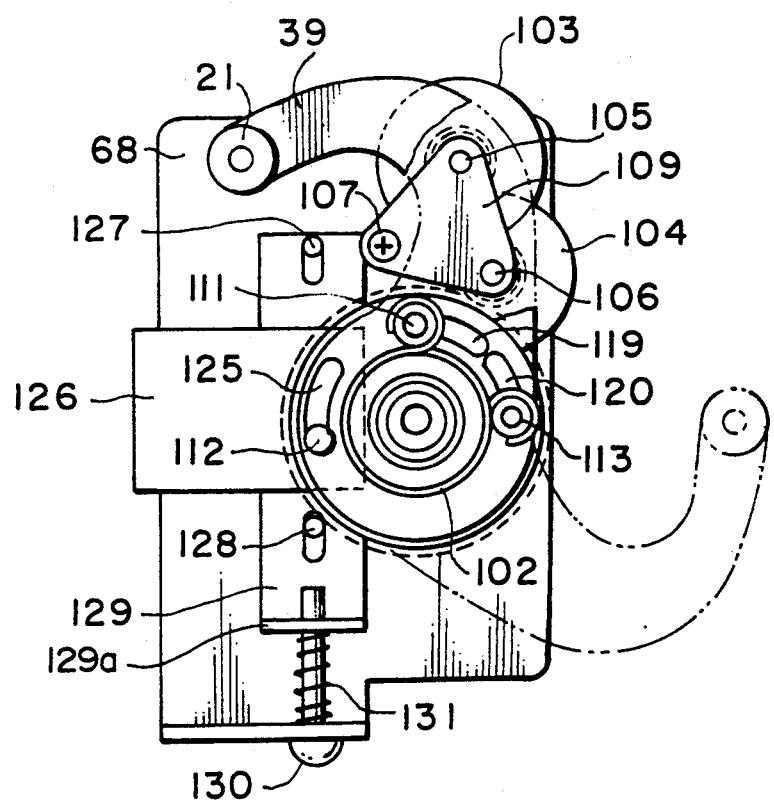
FIG. 13B is a plan view showing the detecting mechanism shown in FIG. 13A.

FIGS. 13A and 13B show the tape tension detecting mechanism in FIG. 1. In the figures, the element designated at a reference numeral 69 is a shaft; 118 is a lever holder; 103 and 104 are gears; 116 is a holder gear; 111 and 113 are pins; 112 is a magnet; 102 is a torsion spring; 114 and 115 are collars; 121, 122 and 134 are bearings; 117 is a holder plate; 132, 133 and 135 are spacers; 105 and 106 are center shafts; 107 and 123 are screws; 110 is a tension pin; 124 is a stopper; 109 is a gear retainer; 127 and 128 are guide shafts; 129 is a base plate; 126 is a sensor substrate; 130 is an adjusting screw; and 131 is a spring.

In FIGS. 13A and 13B, the tension plate 68 is provided with the shaft 69 erected thereon, and the lever holder 118 is rotatably mounted on the shaft 69 through the bearings 121 and 122 in such manner that an inner race of the bearing 122 is secured by the screw 123 through the spacer 133. The tension lever 39 is fixed to the lever holder 118 by means of screws or the like. The tension pin 110 is press fitted into the tension lever 39, and the tension roller 21 is rotateably mounted on the tension pin 110 with the stopper 124 capped at the distal end of the tension pin 110.

Meanwhile, the holder plate 117 which has the magnet 112 press fitted therein and is formed with a slit 120, is rotatably fitted to the lever holder 118. The holder gear 116 which has the pin 113 press fitted therein and is formed with slits 119 and 125 is rotatable with respect to the lever holder 118 through the bearing 134 and is positioned by the spacer 132. The level of the holder plate 117 is determined by the spacer 135. A gap is defined between the inner periphery of the spacer 135 and the lever holder 118. The pin 111 is press fitted at its upper end into the lever holder 118, while it extends through a hole formed in the holder plate 117 and is slideably fitted in the slit 119 of the holder gear 116. The tension lever 39 and the holder plate 117 are thus rotated together. The pin 113 is press fitted at its lower end into the holder gear 116, while it slidably extends through the groove hole 120 of the holder plate 117. The collars 114 and 115 are rotatably fitted on the pins 111 and 113, respectively. The torsion spring 102 is engaged between the collars 114 and 115. This arrangement of the torsion spring 102 is shown in FIG. 13B. In case that the pin 113 is fixed, the tension lever 39 is biased counterclockwise by the torsion spring 102. The holder gear 116 is coupled to the loading ring 27 through the gears 103 and 103. The gears 104 and 104 are rotatably mounted on the center shafts 105 and 106 both planted upright on the tension plate 68, respectively. The gear retainer 109 is secured by the screw 107 to a shaft 108 planted on the tension plate 68.

The sensor substrate 126 is disposed close to the lower surface of the magnet 112. Though not shown, the sensor substrate 126 includes two Hall elements, for example, which are arranged to be spaced in the moving direction of the magnet 112 in opposite relation to the magnet 112. In this case, a rotational angle of the tension lever 39 is detected by using a differential output between the Hall elements. The sensor substrate 126 is fixed to the base plate 129 by means of screws or the like. The base plate 129 is slidable in the lengthwise direction of the slits and is adapted to be stopped by the guide shafts 127 and 128 planted on the tension plate 68. The base plate 129 is positioned at its one end by the adjusting screw 130 through the spring 131, which extends loosely through a hole formed in the tension plate 68.

When the loading ring 27 is revolved clockwise upon start of the loading operation, the gear 103 and the holder gear 116 start rotating counterclockwise, and the gear 104 starts rotating clockwise. The tension level 39 is therefore rotated counterclockwise together with the holder gear 116 and the holder plate 117. As shown in FIG. 1, however, since the distal end of the tension lever 39 is held in abutment with the guide base 35, the tension lever 39 is little moved until the guide base 35 is moved to a certain extent in the loading direction. Accordingly, the holder plate 117, the magnet 112, the pin 111 and the slit 120 which are movable together with the tension lever 39 are also not moved until the guide base 35 is moved to a certain extent. But, the holder gear 116 and the slit 125 and 119 formed thereon, as well as the pin 113 are rotated counterclockwise during such a period. The torsion spring 102 is thus compressed to reduce its mount angle corresponding to an angular space between the pins 111 and 113, and this produces reaction tending to move the tension lever 39 counterclockwise. This reaction is very small as compared with the force applied to move the guide base 35. Further, at the start of the loading operation, the timing at which the tension lever 39 is rotated counterclockwise is delayed from the timing at which the loading ring 27 and the guide base 35 start moving. During the unloading operation, in order to prevent the guide base 35 and the tension lever 39 from meshing with each other, as the guide base 35 is moved in the unloading direction, the tension lever 39 is pushed by the guide base 35 upon encountering the guide base 35, so that the tension lever 39 is then rotated clockwise for being put back into the tape cassette. The tension lever 39 is assembled in such a manner as to produce slight reaction under an unloaded condition. This slight reaction serves as a force for positioning the tension roller 21.

When the guide base 35 is moved beyond a certain extend, the distal end of the tension lever 39 is spaced from the side face of the guide base 35. With the aforesaid reaction, the tension lever 39 is now rotated counterclockwise by the angle through which the torsion spring 102 has been compressed. Under this condition, the relative positional relationship between the holder gear 116 and the holder plate 117 returns back to be the same as that at the initial stage. Afterward, the tension lever 39 is rotated together with the holder gear 116 and the holder plate 117.

The condition where the loading operation has been completed is shown in FIG. 2. The tension roller 21 is brought into contact with the magnetic tape 12, and the tension lever 39 is rotated by such an angle at which the tension of the magnetic tape 12 is balanced by the biasing force of the torsion spring 102. Accordingly, as the tape tension varies, the rotational angle of the tension lever 39 is also varied. Also, the position of the base plate 129 is adjusted beforehand by the adjusting screw 131 such that the magnet 112 is positioned opposite to the Hall elements on the sensor substrate 126 under the above balanced condition. On the other hand, the rotational position of the holder gear 116 is held stationary at a point corresponding to the position where revolution of the loading ring 27 has been terminated.

Incidentally, the collars 114 and 115 serve to prevent the occurrence of an excessive frictional force between the tension lever 39 and the holder gear 116, and hence reduction in the detection accuracy, at the time when the tape tension is detected.

As described above, the following advantageous effects can be obtained with the present invention:

(1) The running path of the magnetic tape is prevented in its direction from being abruptly changed in the widthwise direction of the magnetic tape;

(2) The attitude of the magnetic tape is kept steadily during the tape loading process, so that the magnetic tape is protected from damage and stable tape running is achieved.

(3) Since the pinch roller lever is driven independently of the pinch roller drive motor, the load of the loading motor is alleviated and the loading time is shortened. Further, large power is not required to bring the pinch roller into pressure contact with the capstan, enabling a savings in power consumption;

(4) Since the tilt surfaces necessary for the tape loading operation and the tape running system are all integrally incorporated into the cylinder base, the attitude of the magnetic tape is high-accurately and stably held throughout the tape loading process and the tape running process. The magnetic tape is thus protected from damage; and (5) Since the mechanism for detecting the tape tension is provided and cooperated with operation of the tape loading mechanism, it becomes possible to easily achieve higher accuracy of the running performance of the magnetic tape and more advanced function of VCRs. This further contributes to protect the magnetic tape from damage.

The present invention can be practiced in other forms than disclosed in the foregoing embodiment without departing from the spirit and principal features of the invention. Accordingly, the foregoing embodiment is merely one illustrated example of the present invention in all respects and should not be construed in any limiting sense. The scope of the present invention is defined in attached claims. Modifications and changes which can be made within the range equivalent to the scope of the claims are all included in the scope of the present invention.

What is claimed is:

1. A tape loading mechanism for a VCR of the helical scan type in which a magnetic tape is withdrawn out of a tape cassette and wound round the outer peripheral surface of a rotatable cylinder mounted on a cylinder base, said mechanism comprising:

a plurality of movable tape guide members reciprocable independently and separately from each other between a first position near said tape cassette and a second position located around the outer peripheral surface of said rotatable cylinder and more remote from said tape cassette than said first position, all of or a plural number of said movable members being on a tape running upstream side or a tape running downstream side with respect to said rotatable cylinder around at least the outer peripheral surface of said rotatable cylinder, said all of or plural number of said movable members being movable along the outer periphery of said rotatable cylinder at respective positions offset from each other in the outward radial direction of said rotatable cylinder, said movable members each comprising a first movable portion which comes into contact with a face of said magnetic tape, and a second movable portion connected to said first movable portion for supporting said first movable portion, and said magnetic tape being contacted with said movable members and thereby withdrawn out of said tape cassette when said movable members are operated to move from said first position toward said second position, and said magnetic tape being put back into said tape cassette when said movable members are operated to move from said second position toward said first position; and guide passage forming means, said guide passage forming means being fixed to a stationary component side of said mechanism to be arranged along the outer peripheral surface of said rotatable cylinder, and having such size and configuration as to allow connection of said first position and said second position with each other, for forming guide passages along which said movable members are moved round the outer peripheral surface of said rotatable cylinder, said guide passage forming means including:

a plurality of guide portions formed independently of each other between said first position and said second position along respective movement paths along which respective ones of said movable members are moved between said first position and said second position, each of said plurality of guide portions being engaged with respective ones of said second movable portions of said plurality of movable members and wherein said tape loading mechanism includes stationary tilt guide members fixed to the stationary component side of said mechanism, said stationary tilt guide members each having its surface brought into contact with said magnetic tape withdrawn out of said tape cassette by said movable members for converting the attitude and the running direction of said magnetic tape, and said stationary tilt guide members each being located between respective ones of said plurality of movable members on the tape running path under a condition that said movable members have been moved to at least said second position, wherein said plurality of movable tape guide members are arranged such that said movable members are disposed in plural number independently and separately from each other for each of the tape running upstream side and the tape running downstream side with respect to said rotatable cylinder respectively around opposite sides of the outer peripheral surface of said rotatable cylinder; and said guide passage forming means is arranged such that in association with said tape guide members, said guide portions are formed in plural number independently and separately from each other for each of the tape running upstream side and the tape running downstream side with respect to said rotatable cylinder respectively around the opposite sides of the outer peripheral surface of said rotatable cylinder, and wherein said guide passage forming means includes on each of the tape running upstream side and the tape running downstream side at least one guide portion comprising a first rectilinear plane portion which extends between said first position and said second position and has a first tilt angle tilted in the direction from said first position toward said second position with the plane of said tape cassette as a reference, and a second rectilinear plane portion which has a second tilt angle which is similar to a tilt angle of one of said stationary tilt guide members of the mechanism.

2. A tape loading mechanism for a VCR according to claim 1, wherein said second tilt angle is larger than said first tilt angle.

3. A tape loading mechanism for a VCR according to claim 2, wherein said first rectilinear plane portion and said second rectilinear plane portion are tilted in the same direction.

4. A tape loading mechanism for a VCR according to claim 1, wherein said first rectilinear plane portion and said second rectilinear plane portion are tilted in the same direction.

5. A tape loading mechanism for a VCR of the helical scan type in which a magnetic tape is withdrawn out of a tape cassette and wound round the outer peripheral surface of a rotatable cylinder mounted on a cylinder base, said mechanism comprising:

a plurality of movable tape guide members reciprocable independently and separately from each other between a first position near said tape cassette and a second position located around the outer peripheral surface of said rotatable cylinder and more remote from said tape cassette than said first position, all of or a plural number of said movable members being on a tape running upstream side or a tape running downstream side with respect to said rotatable cylinder around at least the outer peripheral surface of said rotatable cylinder, said all of or plural number of said movable members being movable along the outer periphery of said rotatable cylinder at respective positions offset from each other in the outward radial direction of said rotatable cylinder, said movable members each comprising a first movable portion which comes into contact with a face of said magnetic tape, and a second movable portion connected to said first movable portion for supporting said first movable portion, and said magnetic tape being contacted with said movable members and thereby withdrawn out of said tape cassette when said movable members are operated to move from said first position toward said second position, and said magnetic tape being put back into said tape cassette when said movable members are operated to move from said second position toward said first position; and guide passage forming means, said guide passage forming means being fixed to a stationary component side of said mechanism to be arranged along the outer peripheral surface of said rotatable cylinder, and having such size and configuration as to allow connection of said first position and said second position with each other, for forming guide passages along which said movable members are moved round the outer peripheral surface of said rotatable cylinder, said guide passage forming means a including a plurality of guide portions formed independently of each other between said first position and said second position along respective movement paths along which respective ones of said movable members are moved between said first position and said second position, each of said plurality of guide portions being engaged with respective ones of said second movable portions of said plurality of movable members and wherein said tape loading mechanism includes stationary tilt guide members fixed to the stationary component side of said mechanism, said stationary tilt guide members each having its surface brought into contact with said magnetic tape withdrawn out of said tape cassette by said movable members for converting the attitude and the running direction of said magnetic tape, and said stationary tilt guide members each being located between respective ones of said plurality of movable members on the tape running path under a condition that said movable members have been moved to at least said second position, wherein said plurality of movable tape guide members are arranged such that said movable members are disposed in plural number independently and separately from each other for each of the tape running upstream side and the tape running downstream side with respect to said rotatable cylinder respectively around opposite sides of the outer peripheral surface of said rotatable cylinder; and said guide passage forming means is arranged such that in association with said tape guide members, said guide portions are formed in plural number independently and separately from each other for the tape running upstream side and/or the tape running downstream side with respect to said rotatable cylinder respectively around the opposite sides of the outer peripheral surface of said rotatable cylinder, and wherein said guide passage forming means is arranged such that a first guide portion and a second guide portion are tilted in the moving direction of said tape guide members from said first position toward said second position with the plane of said tape cassette being as a reference, and have tilt angles larger than those of a third guide portion and a fourth guide portion which are disposed more remote from the outer peripheral surface of said rotatable cylinder than said first guide portion and said second guide portion, respectively, wherein said movable tape guide members are arranged such that on both the tape running upstream side and the tape running downstream side with respect to said rotatable cylinder, the outer movable members disposed more remote from the outer peripheral surface of said rotatable cylinder are operated to move from said first position toward said second position ahead of the inner movable members disposed nearer to the outer peripheral surfaced of said rotatable cylinder, respectively.

6. A tape loading mechanism for a VCR of the helical scan type in which a magnetic tape is withdrawn out of a tape cassette and wound round the outer peripheral surface of a rotatable cylinder mounted on a cylinder base, said mechanism comprising:

a plurality of movable tape guide members reciprocatable independently and separately from each other between a first position near said tape cassette and a second position located around the outer peripheral surface of said rotatable cylinder and more remote from said tape cassette than said first position, said movable members each having a first movable portion coming into contact with the face of said magnetic tape, and a second movable portion connected to said first movable portion for supporting said first movable portion, and stationary tilt guide members fixed to said cylinder base, said stationary tilt guide members being located along with said movable members in the tape running path around the outer peripheral surface of said rotatable cylinder, and each having its surface brought into contact with said magnetic tape withdrawn out of said tape cassette by said movable members for converting the attitude and the running direction of said magnetic tape, said magnetic tape being contacted with said movable members and thereby withdrawn out of said tape cassette when said movable members are operated to move from said first position toward said second position, and said magnetic tape being put back into said tape cassette when said movable members are operated to move from said second position toward said first position; and guide passage forming means, said guide passage forming means being fixed to a stationary component side of said mechanism to be arranged along the outer peripheral surface of said rotatable cylinder, and having such size and configuration as to allow connection of said first position and said second position with each other, for forming guide passages along which said movable members are moved between said first position and said second position, said guide passage forming means including a plurality of guide portions independently of each other between said first position and said second position along respective movement paths along which respective ones of said movable members are moved between said first position and said second position, each of said plurality of guide portions being engaged with respective ones of said second movable portions of said plurality of movable members, and wherein said tape loading mechanism is arranged such that said movable members are disposed in plural number independently and separately from each other for each of the tape running upstream side and the tape running downstream side with respect to said rotatable cylinder respectively around opposite sides of the outer peripheral surface of said rotatable cylinder, and wherein said guide passage forming means is arranged such that in association with said movable tape guide members, said guide portions are formed in plural number independently and separately from each other for each of the tape running upstream side and the tape running downstream side with respect to said rotatable cylinder respectively around opposite sides of the outer peripheral surface of said rotatable cylinder, and wherein said guide passage forming means is arranged such that a first guide portion and a second guide portion are tilted in the moving direction of said tape guide members from said first position toward said second position with the plane of said tape cassette being as a reference, and have tilt angles larger than those of a third guide portion and a fourth guide portion which are disposed more remote from the outer peripheral surface of said rotatable cylinder than said first guide portion and said second guide portion, respectively, wherein said tape guide members are arranged such that on both the tape running upstream side and the tape running downstream side with respect to said rotatable cylinder, the outer movable members disposed more remote from the outer peripheral surface of said rotatable cylinder are operated to move from said first position toward said second position ahead of the inner movable members disposed nearer to the outer peripheral surface of said rotatable cylinder, respectively.

* * * * *